(12) United States Patent
Minium, Jr. et al.

(10) Patent No.: US 7,827,565 B2
(45) Date of Patent: Nov. 2, 2010

(54) INTEGRATION ARCHITECTURE FOR NON-INTEGRATED TOOLS

(75) Inventors: Dennis W. Minium, Jr., Sammamish, WA (US); Ozan Hafizogullari, Redmond, WA (US); Xiongjian Fu, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1410 days.

(21) Appl. No.: 10/799,463

(22) Filed: Mar. 12, 2004

(65) Prior Publication Data

US 2005/0204367 A1 Sep. 15, 2005

(51) Int. Cl.
*G06F 9/54* (2006.01)
*G06F 9/44* (2006.01)

(52) U.S. Cl. .................. 719/330; 717/101; 717/120; 717/124

(58) Field of Classification Search ................ 719/315, 719/316, 328, 330
See application file for complete search history.

(56) References Cited

U.S. PATENT DOCUMENTS

| | | | |
|---|---|---|---|
| 5,890,161 A | | 3/1999 | Helland et al. |
| 6,513,152 B1 | | 1/2003 | Branson et al. |
| 6,611,878 B2 | | 8/2003 | De Armas et al. |
| 6,928,463 B1 | * | 8/2005 | Tene et al. ............... 709/203 |
| 7,069,547 B2 | * | 6/2006 | Glaser .................... 717/154 |
| 7,149,734 B2 | * | 12/2006 | Carlson et al. ............ 707/6 |
| 7,174,348 B1 | * | 2/2007 | Sadhu et al. ............ 707/104.1 |
| 7,269,664 B2 | * | 9/2007 | Hutsch et al. ............ 709/246 |
| 2003/0046282 A1 | * | 3/2003 | Carlson et al. ............ 707/6 |
| 2004/0215635 A1 | * | 10/2004 | Chang et al. ............. 707/100 |

FOREIGN PATENT DOCUMENTS

WO WO03005243 A1 1/2003

OTHER PUBLICATIONS

Sunita Devnani-Chulani, "Modeling Software Defect Introduction," 1998, 11 pages.*
N. Kajler. CAS/PI: a Portable and Extensible Interface for Computer Algebra Systems. In ISSAC'92, pp. 376-386. ACM Press, 1992.
T. Metzner, M. Radimersky, A. Sorgatz, and S. Wehmeier. Towards HighPerformance Symbolic Computing in MuPAD: Multi-Polynomial Quadratic Sieve using Macro Parallelism and Dynamic Modules. In Proc. of IMACS Conference on Applications of Computer Algebra, 1998. 25 pages.
H. Lieberman. Integrating User Interface Agents with Conventional Applications. Proceedings of the 3rd International Conference on Intelligent User Interfaces, pp. 39-46, 1997.

(Continued)

*Primary Examiner*—Li B Zhen
(74) *Attorney, Agent, or Firm*—Workman Nydegger

(57) ABSTRACT

Architecture that facilitates interfacing non-integrated applications. The disclosed architecture comprises a set of APIs and conventions used to enable integration between tools that were not previously architected to be integrated. This provides the basis for server-based partner integration and client integration of tools, and can facilitate the foundation for building a third-party ecosystem. In support thereof, an artifact provider API exposes artifacts of a first application, and an artifact consumer API exposes a reference of a second application, which reference is associated with a link to one at least one of the artifacts of the artifact provider.

26 Claims, 11 Drawing Sheets

OTHER PUBLICATIONS

WIIL. HyperDisco: An object-oriented hypermedia framework for flexible software system integration. Comupter software and applications conference 1995. Compsac 95. Proceedings 19th Annual International Dallas, TX, USA, Aug. 9-11, 1995. Los Alamitos, CA, USA, IEEE Comput. Soc., Aug. 9, 1995. pp. 298-305 XP010192806. ISBN: 1-8186-7119-X. Last accessed Oct. 10, 2007.

Noll, et al. Supporting software development in virtual enterprises. JODI- Journal of Digital information, vol. 1, No. 4, Feb. 1999 (1999-2002), pp. 1-17, XP002446822 http://jodi.tamu.edu/Articles/v01/i04/Noll/?Printable=1>. Last accessed Oct. 10, 2007.

Eclipse Platform Technical Overview. Internet citation (Online) Apr. 6, 2003. XP002301941. Retrieved from the internet on Oct. 21, 2004 http://web.archive.org/web/20030406125817/http://www.eclipse.org/whitepapers/eclipse-overview.pdf>. Last accessed Oct. 10, 2007.

European Search Report for European Patent Application No. EP05101868 dated Sep. 3, 2007, 3 pgs.

* cited by examiner

INTEGRATION ARCHITECTURE FOR NON-INTEGRATED TOOLS

TECHNICAL FIELD

This invention is related to application program interfaces and the use thereof.

BACKGROUND OF THE INVENTION

Traditionally, there exist software tools that are stand-alone, yet when utilized together can provide a more cohesive and greatly improved user experience. Such environments offers a mean for third party vendors and others to provide tools that enhance application and document development.

What is needed is a linking architecture that allows access of features of non-integrated tools.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention disclosed and claimed herein, in one aspect thereof, comprises architecture that facilitates the integration of non-integrated applications, services, or tools. The disclosed Integration Services (IS) is a lightweight architecture for allowing loosely-coupled and individually-architected tools to offer simple data integration through a combination of technology and conventions. It thus provides some of the core benefits offered by a common repository without the repository itself. For example, the IS includes source control and defect tracking, each of which was designed separately with different principles in mind. By introducing a standard way to identify the major items each tool makes public (i.e., their artifacts), it is possible for defects, for instance, to point to source control (and vice versa) without either tool holding intimate knowledge of the other. Moreover, third parties can introduce new tools to the IS with their own, specialized links, to enable lightweight data integration without any modifications to the IS tools.

Disclosed is a set of Application Programming Interfaces (APIs) and conventions used to enable integration between tools that were not architected to be integrated. This solution provides a substantial portion of the benefits of a repository for a small fraction of the cost and commitment to participants. It provides architecture for server-based partner-integration and client-integration for development tools.

In support thereof, there is provided a system that comprises an artifact provider that exposes artifacts of one or more disparate applications, and an artifact consumer that exposes references associated with a link to the artifacts of the artifact provider. A linking component facilitates linking the provider artifacts and the consumer references.

In another aspect of the present invention there is provided a link cache that caches artifacts and artifact references, and links.

In yet another aspect thereof, a user interface is provided that facilitates presenting inter-artifact references.

In still another aspect of the present invention, there is provided a link manager that at least facilitates cache synchronization with each tool.

In another aspect thereof, there is provided a generic artifact provider (GAP) where all methods from an artifact provider and consumer are implemented by the GAP. An artifact in generic artifact schema-format is pushed into a GAP database.

To the accomplishment of the foregoing and related ends, certain illustrative aspects of the invention are described herein in connection with the following description and the annexed drawings. These aspects are indicative, however, of but a few of the various ways in which the principles of the invention can be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

Figure 1:
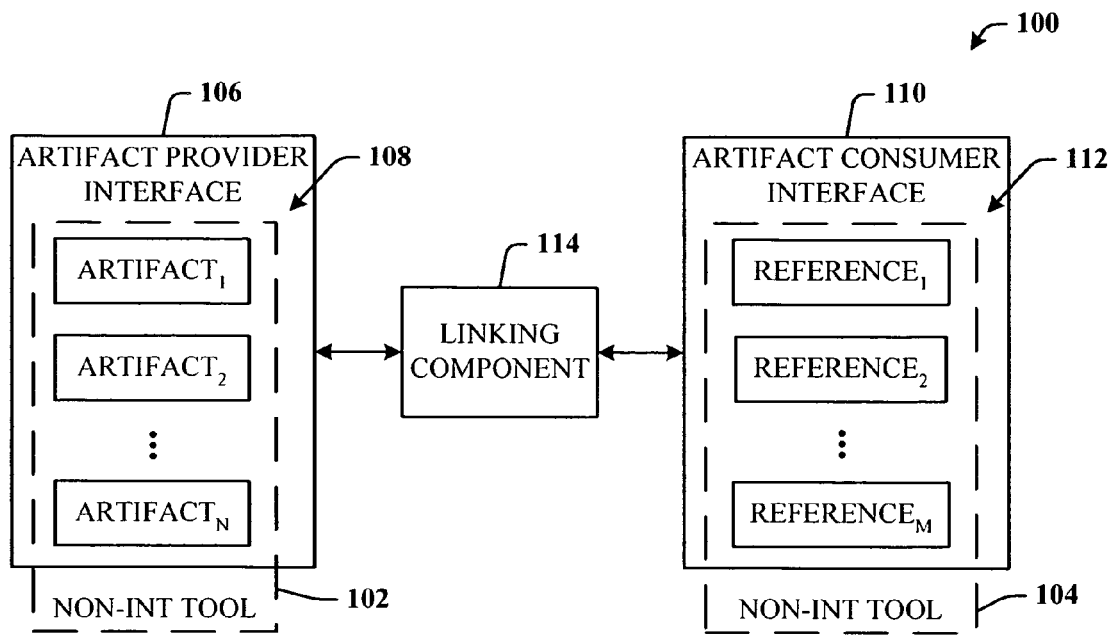
FIG. 1 illustrates a system of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention can be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

DEFINITIONS

The following terms are used throughout the description, the definitions of which are provided herein to assist in understanding various aspects of the subject invention.

Artifact: Any item of data a tool exposes publicly so that other tools can hold pointers to it. Each artifact must be of an artifact type. Each artifact must be identified by a unique and immutable artifact identifier. Examples: source file foo.cs, work item 125, test results from build 20041205.3.

Artifact Consumer: Informally, a tool or service that exposes references it holds to artifacts that are hosted by artifact providers. More formally, a service that exposes references it holds to artifacts that are hosted by artifact providers. For instance, C's work item (itself an artifact) can hold references to P's change sets that were checked in as the work item was being processed. In this case, C is the artifact consumer and P is the artifact provider. An artifact consumer must offer certain standard behaviors. Note that, since by definition a link is between two artifacts, an artifact consumer must also be an artifact provider.

Artifact Identifier: An objectified version of the unique, immutable identifier for a particular artifact (ArtifactUri). The properties in an artifact identifier conform to the rules for URIs.

Artifact Provider: Informally, a tool or service that hosts and exposes artifacts to which an artifact consumer can link. More formally, it is a service that exposes artifacts. For instance, C exposes artifacts of type defect, requirement, and task through web services, making it an artifact provider. An artifact provider must offer certain standard behaviors. Note that, since by definition a link is between two artifacts, many artifact providers can also be artifact consumers.

Artifact Proxy: An artifact stored by a Generic Artifact Provider (GAP) that represents data stored in a non-integrated service enabled store.

Artifact Type: A type of data a tool exposes publicly. An artifact of a particular artifact type has a common set of link types with other artifacts of that type. Examples include, but are not limited to, a source file, defect, requirement, test result, and build.

Artifact URI: A Uniform Resource Identifier that conforms to specific rules for well formedness. Synonym of Integration Services (IS) Uri.

Integration Services (IS)—The disclosed lightweight architecture that allows simple data integration of loosely-coupled and individually-architected non-integrated tools through a combination of technology and conventions. Any service or tool that has not been enabled by the IS architecture is termed "non-IS" or also, non-integrated.

IS Namespace: A namespace that corresponds to a collection of IS-enabled products and artifacts, that can be thought of as a "logical server," where its physical elements can be scattered across multiple physical servers. Tools register themselves with an IS Namespace at installation time, and all tools are accessible through the IS location table. Each artifact is owned by one IS Namespace.

IS Uri: A Uniform Resource Identifier that conforms to IS-specific rules for well formedness. Synonym of ArtifactUri.

External Identifier: Meaningful in the context of the IS GAP. Refers to the identifier by which a non-IS enabled tool refers to an artifact.

Generic Artifact Provider (GAP): The IS GAP is an IS-provided facility that enables construction of artifact proxies to impart artifact-handling behavior to tools that are not fully IS-enabled.

Generic Artifact Schema (GAS): A common schema for describing a collection of artifacts. Each artifact includes its extended attributes and the links it holds to other artifacts.

Generic Link Schema (GLS): A common schema for describing a collection of links. Each link includes its referring and referenced ArtifactUris, and its link type.

Inbound Link: A link from the standpoint of the referenced artifact (i.e., the artifact being pointed to). Inbound links to a referring artifact can be discovered using the standard GetReferencingArtifacts method used for implementation by artifact consumers.

Link: An artifact identifier held by an artifact consumer to point to an artifact. A link is binary and involves exactly two artifacts, the referring artifact and the referenced artifact. A link is formed when a tool (an artifact consumer) holds an artifact identifier to a different artifact. Each link must be of a link type. Note that a well-formed link is between two artifacts, the referring artifact and the referenced artifact. A pointer between an artifact and a non-artifact is not a link. Example: bug 125 was found in build 20041205.4, where "bug" and "build" are artifact types and "was found in" is a link type.

Link Type: Describes the purpose of links of that type. May constrain the artifact type of artifacts to which valid links can be constructed. Each link includes two readings (or roles), one from each (outbound and inbound) direction. For instance: bug 125 was found in build 20041205.4 vs. build 20041205.4 exposed bug 125.

Loose Coupling: In the context of linking, a quality of behavior that does not require either the artifact provider to have knowledge of any artifact consumers. For instance, when an artifact provider issues a reference inversion query using a IS cross-service inversion query tool, IS returns a set of references according to a schema that is common to all artifacts.

Outbound Link: A link from the standpoint of the referring artifact (i.e., the artifact that points to some other artifact). Outbound links to a referenced artifact are returned by the standard GetArtifacts method required for implementation by artifact providers.

Reference Inversion (also inversion query): In general, reference inversion is the process of discovering what items hold pointers to (refer to) a specific item. In IS, it is the process of discovering which referring artifacts hold links to a specific referenced.

Referenced Artifact: Used in the context of a link. The referenced artifact is the side of the link to which the referring artifact points. A referenced artifact is always hosted by an artifact provider.

Referencing (or Referring) Artifact: Used in the context of a link. The referring artifact is the side of the link that holds the reference to a referenced artifact. It is hosted by an artifact consumer.

Tight Coupling: In the context of linking, a quality of behavior that requires the artifact consumer to have specific knowledge about the artifact provider. For instance, if the provider offers a specialized reference inversion method (perhaps it includes special filters or passes back specific information of particular interest to the subject consumer) and the consumer takes advantage of it, that interaction is said to be tightly coupled.

Tool-specific Id (TSId): The final part of a well formed IS Uri. The combination of tool instance, artifact type, and tool-specific Id must be unique within a IS Namespace. Further, the TSId must be immutable.

Referring now to FIG. 1, there is illustrated a system 100 of the present invention. For purposes of this description, there are provided only two non-integrated tools (or services, but hereafter, collectively called a tool): a first tool 102, and a second tool 104. However, it is to be understood that there can be any number of non-integrated tools available that can be enabled to interact by employing one or more interfaces in accordance with the present invention. In this implementation, the first tool 102 will be designated a provider, and the second tool a consumer. Since both tools (102 and 104) are non-integrated tools, the interfaces of the present invention facilitate exposing data of these tools (102 and 104), as can be done with integrated tools. The exposed data is in the form of artifacts, and references to these artifacts. In support thereof, an artifact provider interface 106 (in the form of, for example, an application programming interface-API) is implemented with the first tool 102 that facilitates exposing one or more artifacts 108 (denoted ARTIFACT$_1$, ARTIFACT$_2$, . . . , ARTIFACT$_N$) of the first tool 102. The second tool 104 will be designated a consumer of the artifacts 108. In accordance with the present invention, there is provided an artifact consumer interface 110 that exposes one or more references 112 (denoted REFERENCE$_1$, REFERENCE$_2$, . . . , REFERENCE$_M$) of the second tool 104 that can reference the one or more artifacts 108 of the first tool 102.

The artifacts 108 of the first tool 102 are associated to the references 112 of the second tool 104 by a linking component 114. The linking component can be part of the consumer interface 110; however, this is not required. The linking component 114 defines a link that includes an artifact identifier that points to at least one of the artifacts 108. The link is of a link type, and is binary, in that, it involves two artifacts: a referring artifact, and a referenced artifact.

Thus, the disclosed architecture comprises a set of APIs and conventions used to enable integration between tools that were not previously architected to be integrated. This provides the basis for server-based partner integration and client integration of tools, and can facilitate the foundation for building a third-party ecosystem.

Figure 2:
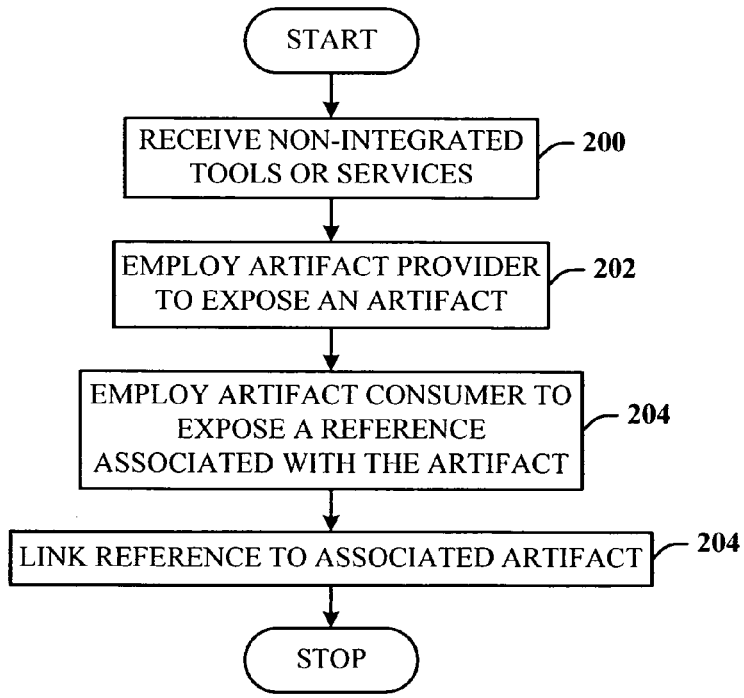
FIG. 2 illustrates a flow chart of a process in accordance with the present invention.

Referring now to FIG. 2, there is illustrated a flow chart of a process in accordance with the present invention. While, for purposes of simplicity of explanation, the one or more methodologies shown herein, e.g., in the form of a flow chart, are shown and described as a series of acts, it is to be understood and appreciated that the present invention is not limited by the order of acts, as some acts may, in accordance with the present invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

At 200, the non-integrated tools are available for use, yet cannot be employed as integrated tools. At 204, an artifact provider API is employed with one of the tools to expose its artifacts for public use. At 206, an artifact consumer API is employed on another tool to expose its references associated with the artifacts. At 208, the references are linked to the artifacts, making the tools integrated. The process then reaches a Stop block.

Figure 3:
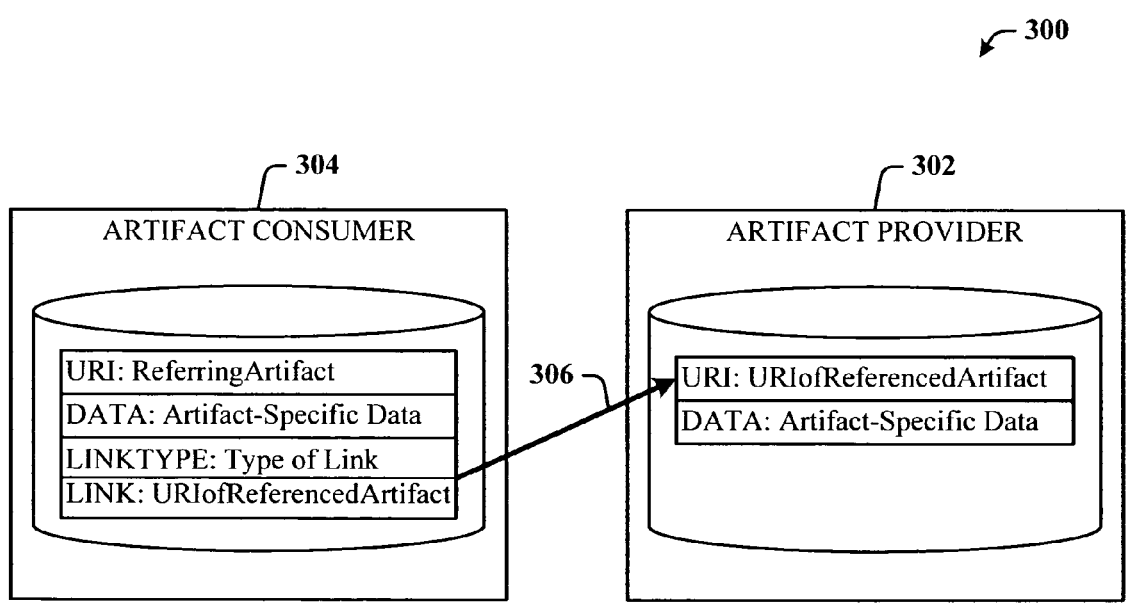
FIG. 3 illustrates a linking pattern of a consumer and provider and, referring and referenced artifact associations.
Figure 4:
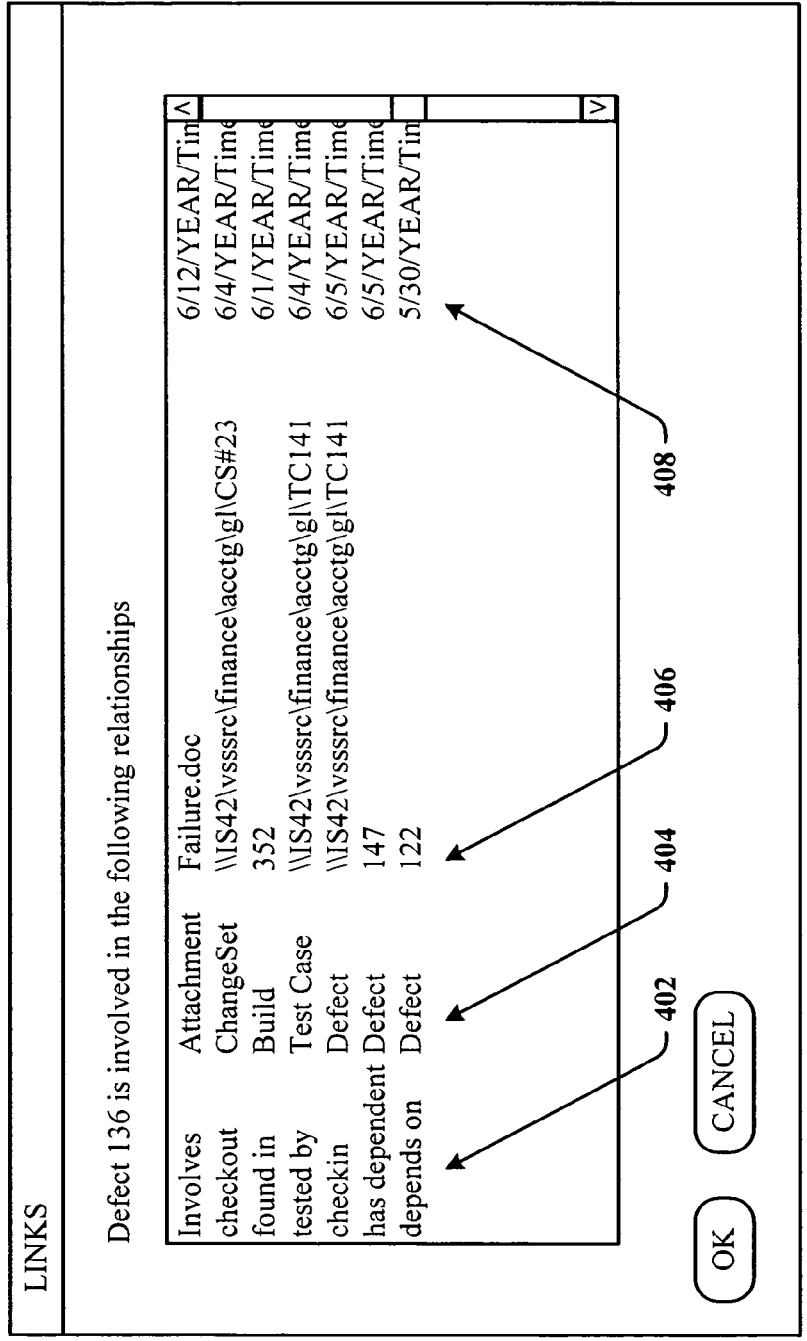
FIG. 4 illustrates a user interface (UI) that facilitates the presentation of artifact dependencies.

Referring now to FIG. 3, there is illustrated a linking pattern 300 of a consumer and provider and, referring and referenced artifact associations. An artifact provider 302 can create and reveal a number of different types of URIs (Uniform Resource Identifiers) for supporting at least the following entities: a loosely coupled server-based interaction, a loosely-coupled client, caching, and tightly-coupled interactions that support any artifact-specific functions by contract with callers. As illustrated, the provider 302 creates the URI of the referenced artifact that facilitates exposing artifact-specific data. An artifact consumer 304 holds a link to the referenced artifact, and URI to the referring artifact, that exposes the artifact-specific data. Along with the link, is the link type. The URI to the referenced artifact supports loosely coupled interactions and tightly coupled interactions, where the latter support any artifact-specific functions by contract with callers. A link 306 is established from the consumer 304 to the provider 302 to expose the artifact data to the consumer 304. Note that use of a link is neither restricted to the structure represented by the disclosed URI nor a URI, generally, but can be of any type of linking mechanism. Referring now to FIG. 4, there is illustrated a user interface (UI) 400 that facilitates the presentation of artifact dependencies. The UI 400 can be used to display link type information 402 from a registered Link definition, artifact type information 404 from a registered Artifact definition, artifact name information 406 from GetArtifact, and last-modified information 408 from GetArtifact.

Principal elements of the present invention include the following. Persistent data includes artifact metadata, link instances, and artifact/link instance cache information. With respect to artifact metadata, in order to participate in the linking service, each artifact provider registers the artifact type for each artifact it provides and registers the link types each of those artifacts may host. With respect to link instances (generic artifact provider database), for tools in which it is difficult or inconvenient to store links natively, the disclosed linking architecture includes a "generic artifact provider" implementation. The cache facilitates caching artifacts and their links to optimize query performance.

Common formats and schemas include an artifact ID, a generic artifact schema (GAS), and generic artifact database schema (GADS). The artifact ID is an immutable and unique constructed key. It is exposed through services offered by an artifact provider and is materialized as a URI. The GAS is a common and abbreviated form in which any artifact, along with its outbound links, can be returned through a generic request. The GADS enables storage of artifacts and links presented in generic artifact schema form. It is used as the schema for both the generic artifact provider and the artifact/link cache.

The architecture of the present invention also includes an API and conventions for a link-enabled artifact provider. This API is implemented by each tool or service that participates in integration. A GetArtifacts method returns 1:m artifacts in generic artifact schema-format based on a string of artifact ID's. By convention, each GetArtifact implementation raises ArtifactChanged events to the Link Cache Manager (and other tools in the environment) returning generic artifact schema-conform ant artifacts. A SynchronizeArtifactCache method reports artifacts and links to the cache asynchronously by raising events similar to ArtifactChanged.

The architecture also includes an API for a link-enabled artifact consumer. This API must be implemented by each tool or service that participates in linking and holds links to other artifacts. A GetReferencedArtifacts method returns the list of artifacts that point to a supplied set of artifact IDs in generic artifact schema-format.

Also provided is an API for a Link Manager. A GetArtifacts method returns a set of artifacts potentially from multiple providers in generic artifact schema-format. If the Artifact/Link cache is enabled the answer is derived from it unless overridden, in which case the providers are individually queried and their responses aggregated. A GetReferencedArtifacts method returns the list of artifacts, potentially from multiple providers that point to a supplied set of artifact IDs in generic artifact schema-format. A SynchronizeArtifactCache method invokes each tool's SynchronizeArtifactCache method for full cache synchronization.

The architecture provides an API for a generic artifact provider (GAP). All methods from the artifact provider API are implemented by the GAP. All methods from the artifact consumer API are implemented by the GAP. An UpdateArtifactData method pushes an artifact in generic artifact schema-format into the GAP database. A GetArtifactsByExternalID method enables query of the GAP database by an identifier that may not conform to an ArtifactID but is understood by the underlying tool.

A re-hostable UI is provided for showing inter-artifact references.

Well-Formed is URIs

An artifact's identifier consists of a well formed IS Uri. Each IS Uri is formed by the artifact's provider. While some elements that make up a well-formed Uri are derived from the IS environment, others are supplied by the tool itself. The following discussion identifies each element of the Uri and explains how its value is derived.

Following is a sample of a well-formed IS Uri:

http://<ISNamespace>/vset/<tooltype>.<toolinstance>/{<artifacttype>/}<tool-specific id>

- http is a constant that appears because the Uri can appear outside of the IDE Integrated Development Environment). If it does, it will be handled according to the rules described hereinbelow under "External Addressability".
- Each IS logical server defines a namespace. <ISNamespace> is the simply the name of the server; e.g., "Server22."
- vset is a constant that enables IS Uri handlers to recognize the string as a IS Uri.
- <tooltype> identifies the tool interface supported by the tool responsible for maintaining and answering questions about the artifact (i.e., the artifact provider). This enables a calling tool (one holding a link) to make decisions about how to handle an artifact based on the interface offered by the tool. Example: vsbug, vsversionstore, etc. Tooltype identifies the API and is specified by the tool.
- <toolinstance> describes the specific instance of the artifact provider responsible for the identified artifact. The combination <tooltype><toolinstance> are unique within a IS Namespace. For instance, Tooltype instance is assigned by IS at installation time and stored in the tool.
- <artifacttype> (optional) is the type of artifact maintained by the tool. A tool will only supply an artifact type if the type is immutable (i.e., if the type of an instance cannot change over its lifetime). Artifact types are registered by the tool at installation time.
- <tool-specific id> is an immutable reference to the artifact instance. Tool-specific id is created and maintained by the tool.

Examples:

Uri pointing to a file stored in H: http://Server08/vset/vsversionstore.2/file/b4e3216

Uri pointing to requirement record in C: http://Server08/vset/vsbug.1/req/345

Encode/Decode Artifact URI Utility Functions

In order to encourage consistent formatting of URIs, the IS offers a pair of utility functions to encode and decode them based on a structure.

string EncodeUri{ArtifactId artifactId}

EncodeUri takes a structure of type ArtifactId and produces a string that conforms to the following URL rules. Non-null values for ArtifactID.ToolInstance (in the form toolType.toolInstance) and ArtifactID.ArtifactType are supplied by the caller. If ArtifactID.ServerNamespace=null, then the name of the currently active namespace is used for the ISNamespace portion of the URI. In most cases, a tool supplies a non-null value for ArtifactID.ToolSpecificID. If ArtifactID.ToolSpecificID=null, then EncodeUri inserts the string "<?>" into tool-specific id. This string has special meaning when adding an artifact to the Generic Artifact Provider; otherwise, its use can be avoided.

ArtifactId DecodeUri (string artifactUri)

DecodeUri takes a string that conforms to IS Uri rules and returns a structure of type ArtifactId.

Example:

The code snippet below illustrates the building of an artifact Id and its conversion to a well formed IS Uri using the EncodeUri method. The resulting URI is:

http://IS001/vset/Work%20Item%20%Tracking.1/defect/5291

DecodeUri works in reverse.

```
public void EncodeUriExample( )
{
    ISServerProxy IS = new ISServerProxy( );
    ArtifactId artId = new ArtifactId( );
    artId.ServerNamespace = null;
    artId.ToolInstance = "WorkItems.1";
    artId.ArtifactType = "defect";
    artId.ToolSpecificId = "5291";
    string Uri = IS.EncodeUri(artId);
}
```

Loose Coupling vs. Tight Coupling

In the IS linking environment, tools use links to enable loosely-coupled behaviors. They can also provide specialized interfaces and interactions that provide a higher-level of specialized integration through tightly-coupled behaviors. Each is valid in the proper context.

Loose coupling offers the following advantages. It is simple to add new artifact types into a web of artifacts without disturbing pre-existing applications. This is especially useful for third party integration. It is possible to aggregate results to provide a complete "where-used" picture for artifacts of varying types. Artifact handlers (providers and consumers) can change behaviors drastically and, as long as they continue to use the generic linking interfaces, all loosely-coupled behaviors will continue to work.

Tools that offer tightly-coupled behaviors exploit links that conform to the linking service but they don't make use of generic linking interfaces. Instead, an artifact consumer takes advantage of specific interfaces offered by the artifact provider. These behaviors can be used to provide cross-tool behavior that is very specific to the participating tools.

Loose coupling can be used when a pointer to a referenced artifact can be present in a referring artifact unknown to the referenced artifact's provider.

Example—A third party test case management tool is introduced into the suite. It is IS-enabled and thus provides a mechanism to build links to defects, for example. The defect does not need to know about this new type of referring artifact to show return information about it in an inversion query.

Loose coupling can also be used when a referring artifact can point to a referenced artifact type it does not know about, and also when the behaviors available for a referenced artifact are not influenced by the referring artifact.

Example—Inside an IDE when a user wants to see what work items are associated with a build, the list of work items is returned in the build's inversion query UI. Likewise, when a user wants to see what work items were affected by a specific change set, a list of work items is returned in the change set's inversion query UI. In either case, the user should be able to double-click any of the work items and a document window for that window will be displayed. The desired behavior is the same whether the referring artifact is a build or a change set; thus, the behavior is not influenced (in these two cases) by the referring artifact.

Loosely-coupled interactions are enabled through artifact providers and consumers (a) following IS conventions and (b) implementing standard interfaces.

How Tools Participate in Linking

Each tool that offers artifacts is an artifact provider. An artifact provider registers its artifact types and implements a set of interfaces that enable a loosely-coupled tool to read those artifacts. Artifact provider responsibilities are detailed under "Artifact Provider Obligations".

An artifact provider that also contains links to other artifacts is an artifact consumer. An artifact consumer has some additional obligations beyond those of a provider. It registers link types and offers standard methods to answer queries and inversion queries. Artifact consumer responsibilities are detailed under "Artifact Consumer Obligations.

Finally, IS itself provides a number of facilities for registration, discoverability, and cross-service link query, which are detailed under "IS APIs".

Artifact Provider Obligations

Any tool that hosts artifacts is an artifact provider. An artifact provider has the following responsibilities, where some are optional, and others are mandatory. At registration time, each artifact provider registers each artifact type it hosts with IS, registers any events it can raise (including artifact change events), registers the URL of its provider web service interface, offers a web service interface that can return the IS Uri for each artifact it owns, offers a GetArtifacts method that can be used to retrieve instances of each artifact type it owns, can include an artifact's Uri as a return value in each method that returns an artifact instance, raises an event when an artifact it owns is created, deleted, or changed in a way that causes a GetArtifacts method execution for that artifact to return a different result, offers a way to handle external addressability for each artifact type it provides, and can implement a client API that responds to in-the-IDE requests for artifacts it owns (ExecuteDefaultAction, GetAllowableActions, ExecuteAction). IS and others can use it to provide uncoupled access between an artifact consumer and provider.

Artifact Type Registration

Registration of Artifact Types and Link Types takes place at installation time. Each tool prepares an XML (eXtensible Markup Language) document that conforms to the IS Registration Service XML Schema. The following information is required for each artifact type: Provider responsible for artifacts of this type; Artifact type name (not localizable); and Artifact type label (localizable). The following information is required for each link type: Artifact type name of referring artifact; Link type name (not localizable); Link type label (localizable); Inverse link type label (localizable); and optional referenced artifact types array. With regard to the Link type label, forward and inverse is used to provide readings in either direction, e.g., man bites dog, dog is bitten by man. If the referenced artifact types array is empty, the referenced end of the link is untyped. That is, links of this type may point to any artifact. Each element in the referenced artifact types array indicates both the referenced artifact type's service and the referenced artifact type's name.

Provider Server API—IToolServerLinking

An artifact provider offers the GetArtifacts method to retrieve instances of each artifact type it owns. The GetArtifacts method takes an array of Uris as input. The return value is an array of objects that conforms to the Generic Artifact Display Schema (GAS).

Artifact[ ] GetArtifacts (string[ ] ArtifactUriList)

GetArtifacts can take an array of artifact Ids in the form of a IS Uri. The provider is responsible for returning an artifact instance for each artifact Id represented in GAS format.

Example:

Given the following: an IS Namespace named "IS001", and a defect tracking tool registered to IS001 named "WorkItems.1"; and two work items: Defect 152, and Requirement 153.

Finally, imagine an array named ArtifactUri[ ] with these two elements: http://IS001/vset/WorkItems.1/Defect/152 and http://IS001/vset/WorkItems.1/Req/153

The value of MyArtifacts after this call:

Artifact[ ] MyArtifacts=workItemTool.GetArtifacts(ArtifactUri[ ])

will look similar to the following XML document herein once it has been serialized.

```
<?xml version="1.0" encoding="utf-8" ?>
<Artifacts
xmlns="http://www.company.com/Tool/GenericArtifactSchema.xsd">
    <Artifact>
        <Uri>http://IS001/vset/WorkItems.1/Defect/152</Uri>
        <ProviderName>MS Work Item Tracking</ProviderName>
        <Title>152 (Open)</Title>
        <Type>Defect</Type>
        <LastChangedOn>2003-10-24T20:47:58.170</LastChangedOn>
        <LastChangedBy>dminium</LastChangedBy>
        <ExtendedAttributes>
            <ExtendedAttribute>
                <Name>Status</Name>
                <Value>Open</Value>
            </ExtendedAttribute>
            <ExtendedAttribute>
```

-continued

```
        <Name>Assigned To</Name>
        <Value>Allen Clark (allclark)</Value>
      </ExtendedAttribute>
    </ExtendedAttributes>
    <Links>
      <Link>
        <LinkType>depends on</LinkType>
<ReferencedUri>http://IS001/vset/WorkItems.1/Defect/173</
ReferencedUri>
      </Link>
      <Link>
        <LinkType>found in</LinkType>
<ReferencedUri>http://IS001/vset/Builds.1/Build/2003.11.15</
ReferencedUri>
      </Link>
      <Link>
        <LinkType>checked in</LinkType>
<ReferencedUri>http://IS001/vset/Hat.1/ChangeSet/987Urt5B</
ReferencedUri>
      </Link>
    </Links>
  </Artifact>
  <Artifact>
    <Uri>http://IS001/vset/WorkItems.1/Req/153</Uri>
    <ProviderName>Work Item Tracking</ProviderName>
    <Title>153 (In Work)</Title>
    <Type>Requirement</Type>
    <LastChangedOn>2003-10-27T20:36:52.170</LastChangedOn>
    <LastChangedBy>eeykholt</LastChangedBy>
    <ExtendedAttributes>
      <ExtendedAttribute>
        <Name>Status</Name>
        <Value>In Work</Value>
      </ExtendedAttribute>
      <ExtendedAttribute>
        <Name>Assigned To</Name>
        <Value>Raj Selvaraj (naselvar)</Value>
      </ExtendedAttribute>
    </ExtendedAttributes>
    <Links>
      <Link>
        <LinkType>authored in</LinkType>
<ReferencedUri>http://IS001/vset/Teamhare/ReqDoc/38976FBA</
ReferencedUri>
      </Link>
      <Link>
        <LinkType>depends on</LinkType>
<ReferencedUri>http://IS001/vset/WorkItems.1/Defect/173</
ReferencedUri>
      </Link>
    </Links>
  </Artifact>
</Artifacts>
```

SynchronizeArtifactCache Method

The SynchronizeArtifactCache method is used to reconstruct an artifact cache if it has been damaged.

void SynchronizeArtifactCache( )

The SynchronizeArtifactCache method is invoked by IS to initiate notification of the full set of forward links held by an artifact consumer. The artifact consumer must raise a CacheArtifact event for each of its artifacts (multiple artifacts can be packaged into a single event). IS listens for these events and uses the result to populate to populate a link cache that can be used to resolve simple queries without invoking the consumer's GetArtifacts or GetReferencingArtifacts methods.

void SynchronizeArtifactCache(DateTime from, DateTime to)

SynchronizeArtifactCache can be constrained by a date range. In this case, the artifact consumer is only obliged to issue CacheArtifact events for artifacts modified between from and to, inclusive.

For each artifact held by the artifact provider, the SynchronizeArtifactCache method packages the artifact and its outbound links, if any, as an XML document (conformant with the GAS schema). Note that this formatting requires exactly the same logic as that used by GetArtifacts. The method also raises the CacheArtifact event passing the GAS-conformant XML document to IS.

When the provider has completed its caching activity, it issues an EndCacheLoad event. Note that a GAS document can hold multiple artifacts. Thus, the provider has the option of passing several artifacts to the cache in one fell swoop. IS normally updates its cache by responding to ArtifactChanged events—the same ArtifactChanged events to which other tools subscribe. However, IS also listens to CacheArtifact events, to which other tools and services do not subscribe.

Provider Client API—IToolClientLinking

The artifact provider client API exists to deal with loosely-coupled interactions inside the IDE. For instance, imagine the scenario in which a tool displays a list of artifacts whose Ids are in the Links collection returned as a result of a GetArtifacts call. A user wants to display one of the (arbitrary) artifacts. If the artifact's provider implements the ExecuteDefaultAction method described herein, the holder of the list can invoke the action (most likely a navigation action to display the artifact) without any knowledge of the artifact or the artifact's type.

ExecuteDefaultAction Method

This method can be provided by an artifact provider as part of its provider client. It is installed as part of the provider's client installation and can be discoverable.

bool ExecuteDefaultAction(string artifactUri)

ExecuteDefaultAction takes a single artifact URI as input. The provider client is responsible for executing whatever default behavior is appropriate for the artifact. It returns true if the execution of the default action was successful. ExecuteDefaultAction is not normally invoked directly. Instead, it is invoked through the IS client's ExecuteDefaultAction method.

ArtifactChanged Event

When an artifact is created, deleted, or changed in a way that causes a GetArtifacts method execution for that artifact to return a different result, the artifact provider must raise the ArtifactChanged event.

When an artifact changes, the provider raises an async ArtifactChanged event to IS Eventing using the FireAsyncEvent method. The ArtifactChanged event type is automatically installed as part of IS during registration. It includes an XML document that conforms to the GAS schema. Since GAS includes an artifact's forward links, ArtifactChanged is used to inform listeners of link changes as well as other artifact changes.

The ArtifactChanged event is to be raised whenever an artifact is added, changed or deleted. The GAS schema includes an attribute on the Artifact element that enables a caller to indicate whether the artifact it contains was added, changed or deleted. The following illustrates two changes reported in a single ArtifactChanged event: Defect 152 has been added and Requirement 153 has been deleted.

```
<?xml version="1.0" encoding="utf-8" ?>
<Artifacts
xmlns="http://www.company.com/Tool/GenericArtifactSchema.xsd">
  <Artifact ChangeType="Add">
    <Uri>http://IS001/vset/WorkItems.1/Defect/152</Uri>
    <ProviderName>MS Work Item Tracking</ProviderName>
```

-continued

```
<Title>152 (Resolved)</Title>
<Type>Defect</Type>
<LastChangedOn>2003-10-24T20:47:58.170</LastChangedOn>
<LastChangedBy>dminium</LastChangedBy>
<ExtendedAttributes>
   <ExtendedAttribute>
      <Name>Status</Name>
      <Value>Resolved</Value>
   </ExtendedAttribute>
   <ExtendedAttribute>
      <Name>Assigned To</Name>
      <Value>Peanuts McFadden (nuts)</Value>
   </ExtendedAttribute>
</ExtendedAttributes>
<Links>
   <Link>
      <LinkType>depends on</LinkType>
<ReferencedUri>http://IS001/vset/WorkItems.1/Defect/173</ReferencedUri>
   </Link>
   <Link>
      <LinkType>found in</LinkType>
<ReferencedUri>http://IS001/vset/Builds.1/Build/2003.11.15</ReferencedUri>
   </Link>
   <Link>
      <LinkType>checked in</LinkType>
<ReferencedUri>http://IS001/vset/Hatteras.1/ChangeSet/987Urt5B</ReferencedUri>
   </Link>
</Links>
</Artifact>
<Artifact ChangeType="Delete">
   <Uri>http://IS001/vset/WorkItems.1/Defect/23</Uri>
</Artifact>
</Artifacts>
```

Any tool can register to the generic ArtifactChanged event. In addition, the Artifact/Link Cache listens for these events and uses them to update itself.

External Addressability

An artifact provider offers a way to handle external addressability for each artifact it provides. Imagine that a user puts the URI for a IS artifact into a piece of email. The recipient of the email will be able to do nothing with the URI unless it is externally addressable. If it is, the browser can figure out what to do with it.

Example:

For instance, imagine that the source file stored in the version store at this location:

\\VSServer8\FinProj\Acctg\WebUI\taccts.cs

. . . is represented by this URI:

http://VSServer8/vset/vsversionstore.2/file/b4e3216

Now consider that an email is sent to a user that indicates thata tacct program just failed (where "tacct" is a hyperlink behind which is the IS Uri). When the user selects the hyperlink, he rightly expects that some representation of the thing associated with the URI will be produced. In this case, maybe it is some metadata and descriptive information about the file (to help jog his memory). This is possible because each artifact provider can make those artifacts externally addressable. It does so by providing, at installation time, an page that can handle artifacts of types it manages. This page is stored in a well-known virtual directory on the IS server and is named for its tool instance. The page can be very simple, invoking a simple XSL transform to produce a read-only page. Alternatively, it can be very complex providing the gateway into a full-blown application.

The IS provides an ISAPI (Internet Server Application Program Interface) filter that converts the URI into a URL for directing to the proper directory and enables the page to handle the artifact type and moniker as ordinary parameters.

Example:

This incoming Uri: http://Server8/vset/vsversionstore.2/file/b4e3216 is converted to something like this by the ISAPI filter:

http://Server8/vsversionstore.2.aspx?artifactType=file&id=b4e3216

. . . where "artasp" is the folder on Server8 where the ASP page is stored.

Artifact Consumer Obligations

At registration time, each artifact consumer registers each link type it hosts with IS, registers the URL of its consumer web service interface, subscribes to any events to which it can respond (including artifact change events), offers GetReferencingArtifacts methods that can respond to "do you point to me?" queries, and can respond to ArtifactChanged events; for deletes the referring artifact link should be deleted. For changes, the referring artifact can check for a situation that might cause the link to be invalidated.

Consumer Server API

An artifact consumer must offer GetReferencingArtifacts methods that can respond to "do you point to me?" queries. The GetReferencingArtifacts takes an array of URIs as input. The return value is an array of Artifact objects that conform to the Generic Artifact Database Schema (GAS). Following are the method signatures:

Artifact[ ] GetReferencingArtifacts (string[ ] artifactUriList)

This version of GetReferencingArtifacts takes an array of referenced artifact Ids. The consumer is responsible for returning the list of all referring artifacts it owns that point to any of the included referenced artifacts as GAS-compliant Artifact objects.

Artifact[ ] GetReferencingArtifacts (string[ ] artifactUriList, LinkFilter[ ] linkFilterList)

This version of GetReferencingArtifacts takes an array of referenced artifact Ids and an array of link filters. Link filters can be used to restrict the returned artifacts by tool type offering the artifact, artifact type, or link type.

ArtifactChanged Event Handler

As described herein, each time an artifact materially changes the artifact provider raises the ArtifactChanged event. Each artifact consumer can listen for these ArtifactChanged events by registering an ArtifactChanged event handler.

Each consumer's ArtifactChanged event handler inspects the event to determine whether it holds artifacts of interest. If it does, the consumer's event handler can then respond to the change. Normally such a response takes one of the following forms:

If the consumer only holds a pointer to the artifact, it is frequently only interested in ArtifactChanged in the case of a delete. The consumer removes any links to the deleted artifact.

In some cases there may be specific policy information that requires that the referenced artifact be in a specific state for the referring artifact to hold a link to it. If so, the consumer can ensure that after the change the referenced artifact is still in the correct state; otherwise, the consumer removes its links.

The Artifact/Link Cache uses the ArtifactChanged event to stay up-to-date.

IS APIs

The following APIs are offered directly by various elements in IS.

Server API—EncodeUri/DecodeUri utility methods

GetArtifacts Method

The GetArtifacts method takes an array of URIs as input. The return value is an object that conforms to the GAS. From a logical standpoint, the IS version of GetArtifacts invokes the GetArtifacts methods of each artifact provider for which an artifact is requested. Physically, the query is executed against the Artifact/Link Cache unless the direct parameter=true. The method signature appears below.

Artifact[ ] GetArtifacts (string[ ] artifactUriList)

GetArtifacts takes an array of artifact Ids in the form of a ISUri. The provider is responsible for returning an artifact instance for each artifact Id represented in GAS format. This version of GetArtifacts runs against the IS Artifact/Link Cache.

Artifact[ ] GetArtifacts (string[ ] artifactUriList, bool direct)

This version of GetArtifacts behaves exactly as the form above, except that the caller can provide a value for the direct parameter. When direct=true, the result set is built from calling individual providers GetArtifacts methods directly instead of exploiting the Artifact/Link Cache. This provides up-to-date data at the cost of an expensive aggregate query.

GetReferencingArtifacts Method

The IS Cross-Service Inversion Query, GetReferencingArtifacts, runs as query aggregators of sorts. From a logical standpoint a cross service inversion query requested from IS runs link inversion queries against all IS-enabled tools that might be able to contribute information to a query, aggregates the results from all respondents, and sends a single result set (in the form of an XML document) back to the user. From a physical standpoint, a IS Cross-Service inversion query can actually be executed against the IS Artifact/Link Cache.

Artifact[ ] GetReferencingArtifacts (string[ ] artifactUriList)

This version of GetReferencingArtifacts takes an array of referenced artifact Ids. Each potential artifact consumer (based on registration information) is consulted to build a full list of artifacts. Each consumer is responsible for returning the list of all referring artifacts it owns that point to any of the included referenced artifacts as GAS-compliant Artifact objects. IS then merges the lists and returns a single Artifact array to the client.

Artifact[ ] GetReferencingArtifacts (string[ ] artifactUriList, LinkFilter[ ] linkFilterList)

This version of GetReferencingArtifacts is the same as the previous except that it takes an additional array of link filters. Link filters can be used to restrict the returned artifacts by tool type offering the artifact, artifact type, or link type.

Artifact[ ] GetReferencingArtifacts (string[ ] artifactUriList, bool direct)

This version of GetReferencingArtifacts behaves exactly as the first form except that the caller can provide a value for the direct parameter. When direct=true, the result set is built from calling individual providers' GetReferencingArtifacts methods directly instead of exploiting the Artifact/Link Cache. This provides up-to-date data at the cost of an expensive aggregate query.

Artifact[ ] GetReferencingArtifacts (string[ ] artifactUriList, bool direct, LinkFilter[ ] linkFilterList)

This version of GetReferencingArtifacts behaves exactly as the second form except that the caller can provide a value for the direct parameter. When direct=true, the result set is built from calling individual providers GetReferencingArtifacts methods directly instead of exploiting the Artifact/Link Cache. This provides up-to-date data at the cost of an expensive aggregate query.

Link Helper Methods—ILinking

The IS Link Helper methods post-process an array of Artifact objects in which outbound (referring) links are nested inside each artifact to produce a flat list of links that conforms to the GLS. ExtractLinks returns a flat list of all links found inside an Artifact object array subject to conformance to the optional user-supplied filter.

The third form of ExtractLinks does the same, but only for links whose Referenced Id is passed in through a string array. In that way, ExtractLinks can be paired with GetReferencingArtifacts to create a flat, filtered list of only those links pointing to the artifact Ids of interest.

Link[ ] ExtractLinks(Artifact[ ] artifactList)

Given an Artifact object array in which each link is packaged with its referring artifact, ExtractLinks produces a flat list of links inside a Link array that conforms to the GLS.

Link[ ] ExtractLinks(Artifact[ ] artifactList, LinkFilter[ ] linkFilterList)

In this form of ExtractLinks, a link is only included if it conforms to the filters in linkFilterList.

Link[ ] ExtractLinks(Artifact[ ] artifactList, LinkFilter[ ] linkFilterList, string[ ] artifactUriList)

In this form, only those links whose Referenced URI is included in the ArtifactUri string array are returned. LinkFilterList may be null, if no link type filtering is required.

ExtractLinks Example 1

Produce a Flat List of Links

Get the artifacts that result in the Artifact array. Then extract a flat list of links from that Artifact object array.

```
ISServerProxy IS = new ISServerProxy( );
string[ ] artifactUris = new string[ ]
{"http://IS001/vset/workitems.1/defect/152", "http://IS001/vset/
WorkItems.1/Req/153"};
  Artifact[ ] artifacts = IS.GetArtifacts(artifactUris);
  Link[ ] links = IS.ExtractLinks(artifacts);
```

The links object returned from ExtractLinks corresponds to the XML schema below.

```
<?xml version="1.0" encoding="utf-8" ?>
 <Links xmlns="http://tempuri.org/ISGenericLinkschema.xsd">
   <Link>
<ReferringUri>http://IS001/vset/WorkItems.1/Defect/152</ReferringUri>
     <LinkType>depends on</LinkType>
<ReferencedUri>http://IS001/vset/workItems.1/Defect/173</ReferencedUri>
   </Link>
   <Link>
<ReferringUri>http://IS001/vset/WorkItems.1/Defect/152</ReferringUri>
     <LinkType>found in</LinkType>
<ReferencedUri>http://IS001/vset/Builds.1/Build/2003.11.15</ReferencedUri>
   </Link>
   <Link>
<ReferringUri>http://IS001/vset/WorkItems.1/Defect/152</ReferringUri>
     <LinkType>checked in</LinkType>
  <ReferencedUri>http://IS001/vset/Hatteras.1/ChangeSet/987Urt5B</
```

```
-continued

ReferencedUri>
        </Link>
        <Link>
<ReferringUri>http://IS001/vset/WorkItems.1/Req/153</ReferringUri>
        <LinkType>authored in</LinkType>
    <ReferencedUri>http://IS001/vset/eLeadSharePoint/ReqDoc/
38976FBA</ReferencedUri>
        </Link>
        <Link>
<ReferringUri>http://IS001/vset/WorkItems.1/Req/153</ReferringUri>
        <LinkType>depends on</LinkType>
<ReferencedUri>http://IS001/vset/WorkItems.1/Defect/173</
ReferencedUri>
        </Link>
    </Links>
```

ExtractLinks Example 2

Produce a List of Links that Point to a Particular Defect

Assume that Defect 173 is only referenced from Defect 152 and Requirement 153. In that case, GetReferringArtifacts for Defect 173 will return exactly the same Artifact array. In this example, ExtractLinks is used to return only the links that actually point back to Defect 173.

Figure 5:
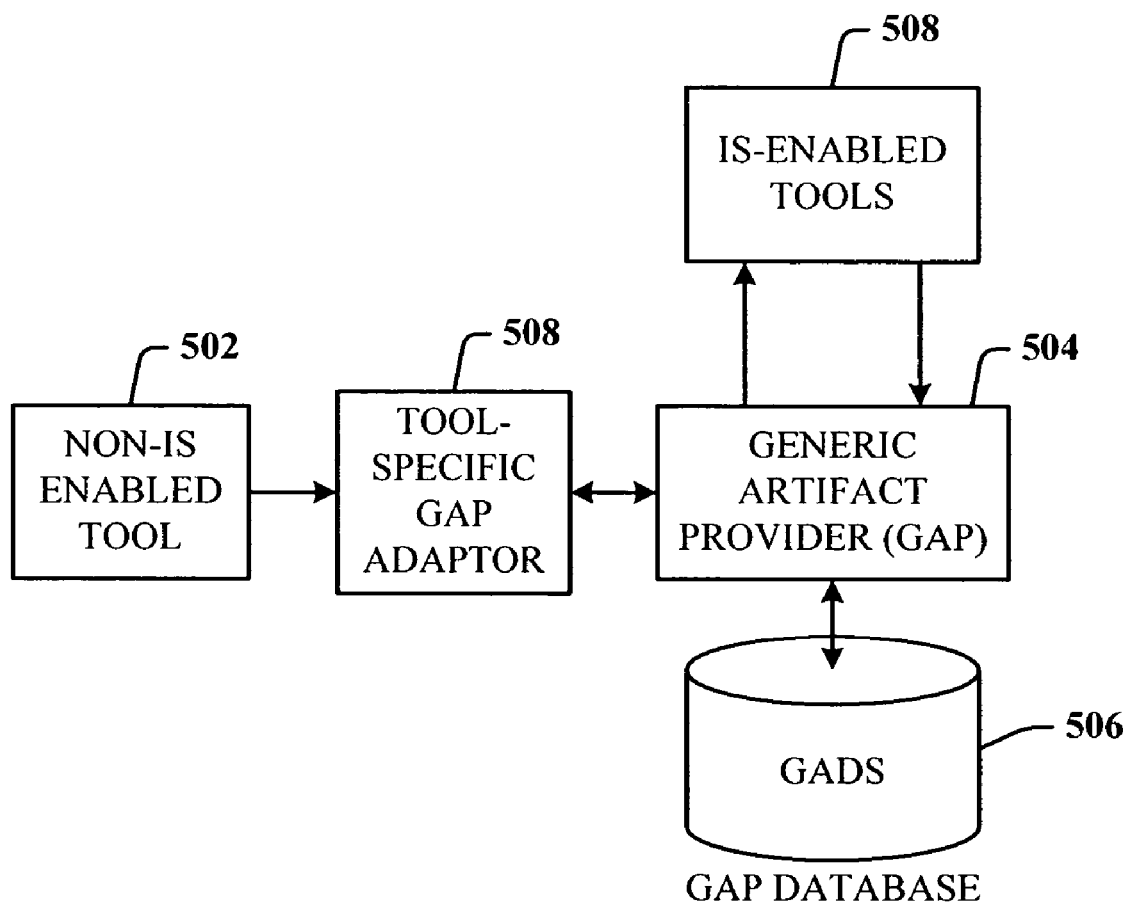
FIG. 5 illustrates a block diagram of one implementation of a GAP API in accordance with the present invention.

```
ISServerProxy IS = new ISServerProxy( );
string[ ] artifactUris = new string[1]
{"http://IS001/vset/workitems.1/defect/173"};
    Artifact[ ] artifacts = IS.GetReferencingArtifacts(artifactUris);
    Link[ ] links = IS.ExtractLinks(artifacts, null, artifactUris);
    The links object returned from ExtractLinks (now filtered by the
same set of artifactUris as GetReferencingArtifacts) is shown in FIG.
5.
    <?xml version="1.0" encoding="utf-8" ?>
    <Links xmlns="http://tempuri.org/ISGenericLinkschema.xsd">
        <Link>
<ReferringUri>http://IS001/vset/WorkItems.1/Defect/152</ReferringUri>
        <LinkType>depends on</LinkType>
    <ReferencedUri>http://IS001/vset/WorkItems.1/Defect/173</
ReferencedUri>
        </Link>
        <Link>
<ReferringUri>http://IS001/vset/WorkItems.1/Req/153</ReferringUri>
        <LinkType>depends on</LinkType>
    <ReferencedUri>http://IS001/vset/WorkItems.1/Defect/173</
ReferencedUri>
        </Link>
    </Links>
```

SynchronizeArtifactCache

This method is invoked to cause a background update to the Artifact/Link Cache.

void SynchronizeArtifactCache( )

The SynchronizeArtifactCache method causes IS to synchronize the artifact cache by invoking each artifact provider SynchronizeArtifactCache method.

void SynchronizeArtifactCache(DateTime from, DateTime to)

SynchronizeArtifactCache can be constrained by a date range. In this case, each artifact consumer is only obliged to issue CacheArtifact events for artifacts modified between from and to, inclusive.

Client API—IClientLinking

The IS client API with regard to linking is made up of a single method. The function of this method is to invoke a tool's default action to display an artifact.

ExecuteDefaultAction bool ExecuteDefaultAction(string artifactUri)

ExecuteDefaultAction takes a single artifact Id as input. The client determines what action to execute based on the artifact's type and the registered mechanisms for handling default actions as follows. If the artifact type is associated with a registered provider client, the provider client's ExecuteDefaultAction is invoked. Otherwise, the ArtifactId is handed to the IS Server for resolution using the external addressability mechanism. If successful, this results in a page being opened inside the IDE. If unsuccessful, the user will see an http 404 error.

The Generic Artifact Provider

Referring now to FIG. 5, there is illustrated a block diagram of one implementation of a GAP API in accordance with the present invention. The GAP is essentially a database application that offers the standard artifact provider and consumer methods. There is provided one or more IS-enabled tools 500 and a non-IS enabled tool 502 some contents of which are desired to be accessed as an integrated tool. To facilitate interaction with the IS-enabled tools 500, the GAP 504 is employed that has associated therewith a GAP database 506. The GAP database 506 is structured in the format of the generic artifact database schema (GADS) described hereinbelow with respect to FIG. 7. In order to interact with the non-IS enabled tool, it is possible to write a GAP adapter 508 so that, with minimal disruption to the original tool 502, tool data can be exposed as IS artifacts and hold links to IS artifacts.

The GAP is specifically intended to address a situation in which it is impossible or inconvenient to satisfy artifact provider/consumer obligations directly in the tool that holds the artifact. For instance, a team wishes to link to and from documents stored in share server as though they were full-fledged artifacts. Sadly, the share server does not implement the IS-enablement APIs, and thus, does not offer IS-compliant URIs for its artifacts or offer the required methods (e.g., GetArtifacts/GetReferencingArtifacts.) Using the GAP, the team can construct an "artifact proxy" for a share document. This proxy can be referenced by other artifacts and is capable of holding links to other artifacts, all on behalf of the real share document it represents.

GAP is also intended to address a situation in which an artifact container is held as a file, either in source code or in the file system. In this case, the tool responsible for creating the artifact has no say in its persistence and thus cannot insist that source control and the file system recognize and store links from the artifact. For instance, one tool wishes to hold links between a model and the source code generated from the model, where a model is stored as source code. Using the GAP, the tool can build an artifact proxy to hold those links. Further, additional artifact proxies can be built to represent artifacts internal to a file, such as a method in a source file or an XML Web Service in a tool model.

Figure 6:
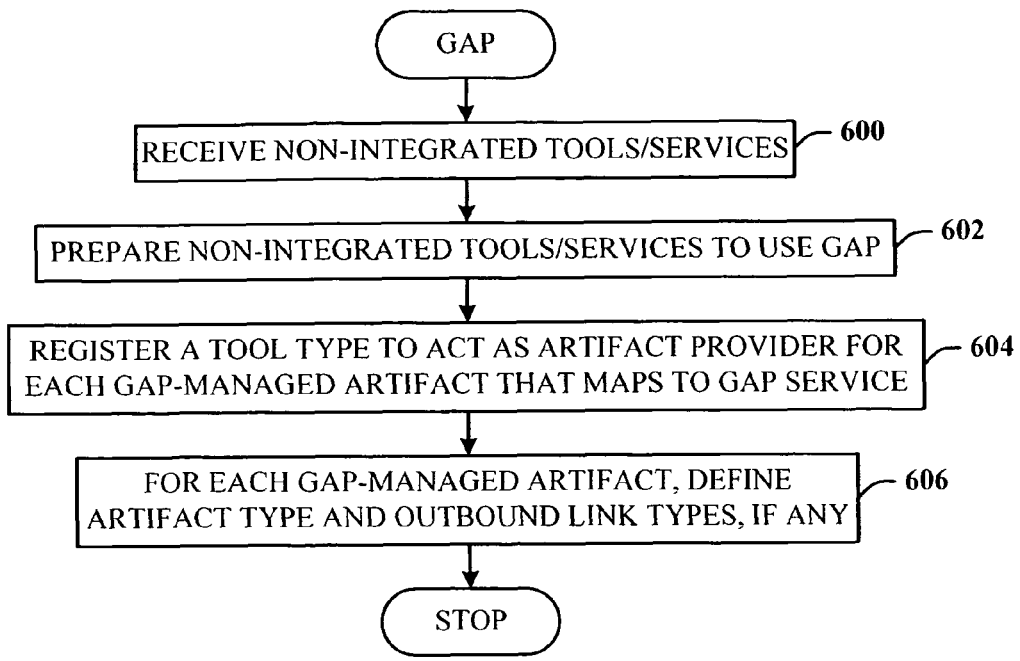
FIG. 6 illustrates a flow chart of one implementation for preparing a non-integrated tool for using the GAP.

Referring now to FIG. 6, there is illustrated a flow chart of one implementation for preparing a non-integrated tool for using the GAP. At 600, one or more non-integrated tools are received. At 602, the one or more non-integrated tools are prepared at registration time for exposing artifacts and references using the GAP in accordance with the present invention. At 604, a tool type is registered to act as an artifact provider for each GAP-managed artifact that maps to a GAP service. For a provider that includes both self-managed and GAP-managed artifacts, the tool type for each must be distinct. At 606, for each GAP-managed artifact, its artifact type and outbound link types are defined, if any. The process then reaches a Stop block.

Figure 7:
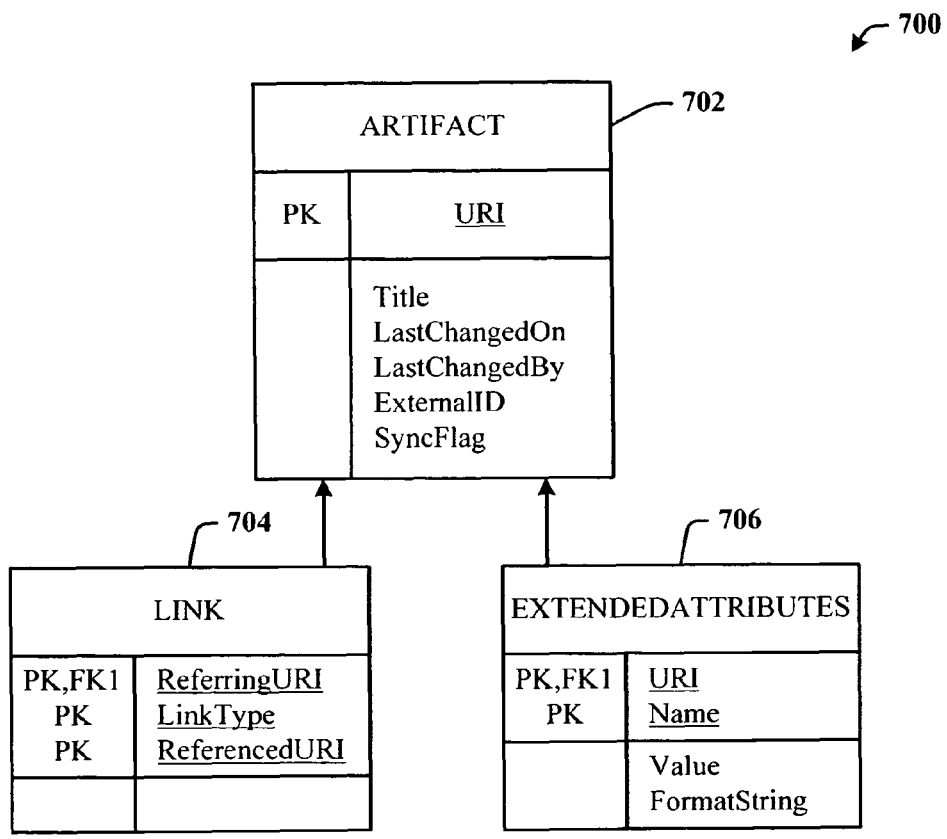
FIG. 7 illustrates a generic artifact database schema (GADS) used for both the GAP and a cache.

Referring now to FIG. 7, there is illustrated a generic artifact database schema (GADS) 700 used both for the GAP and a cache. The GADS 700 includes an Artifact element 702 that contains exactly one displayable artifact, which consists of the following sub-elements: a URI of the returned artifact; an artifact Title, which is the localized friendly name of the returned artifact's types; date and time of last change (LastChangedOn), if available; userId of last person to change this artifact (LastChangedBy), if available; ExternalID, which element is reserved for use by the IS generic artifact provider, and contains information that enables IS and its agents to access an item that has no direct artifact provider; and an optional bit attribute SyncFlag used in the cache and holds the instance-specific synchronization state.

The GADS 700 also includes a Link sub-element 704 of the Artifact element 702 that contains the following: a referring link URI (ReferringURI), link type (LinkType), and referenced link URI (ReferencedURI). An ExtendedAttributes sub-element 706 of the Artifact element 702 contains a collection of name/value pairs that describe optional artifact-specific properties the provider can offer.

Figure 8:
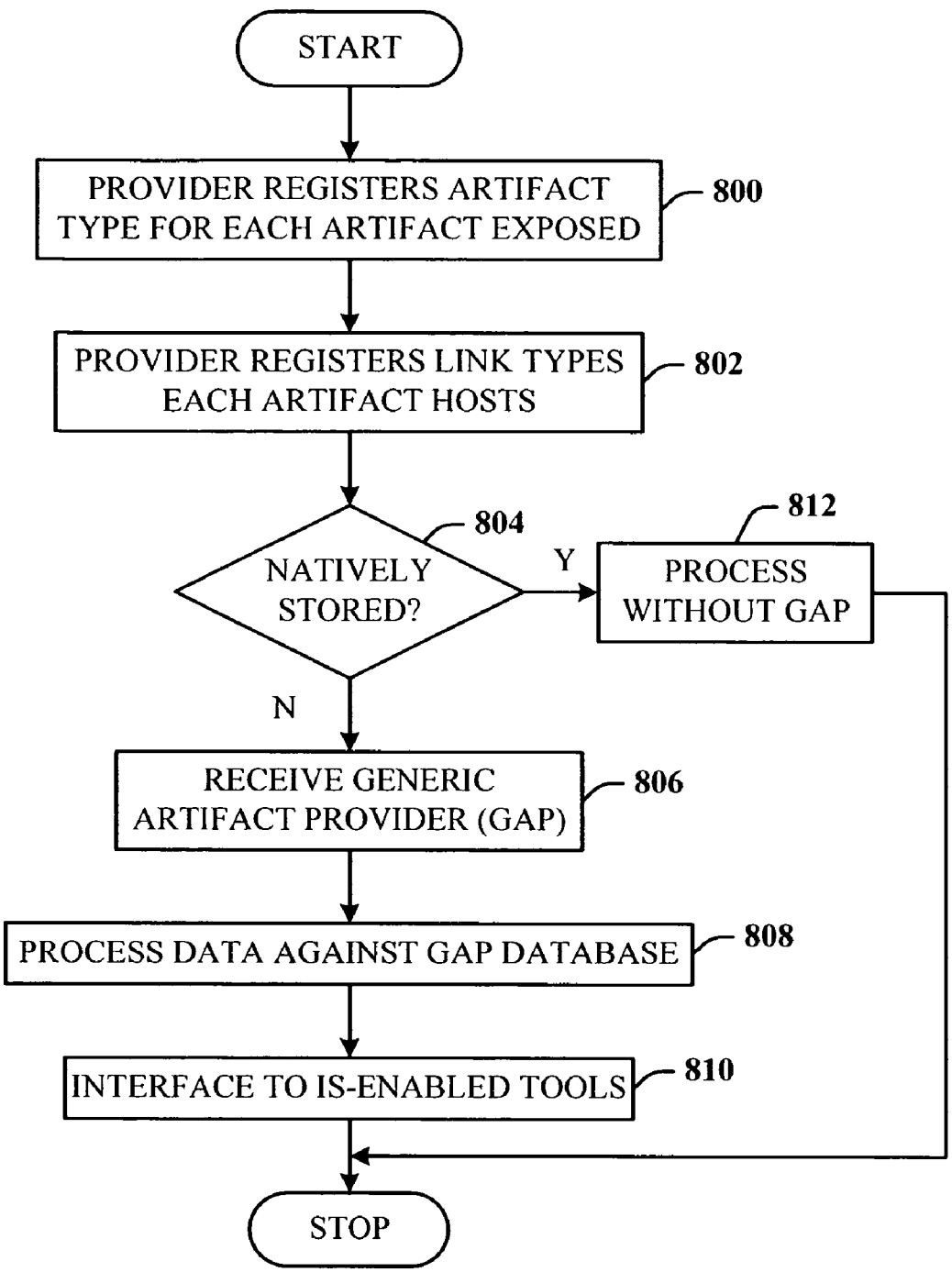
FIG. 8 illustrates a flow chart of one method of implementing the GAP in accordance with the present invention.

Referring now to FIG. 8, there is illustrated a flow chart of one method of implementing the GAP in accordance with the present invention. At 800, a provider registers artifact type information for each artifact exposed. At 802, a provider registers links types for each artifact it hosts. At 804, it is determined whether the registration information can be stored locally or natively. If not, flow is to 806, the GAP is employed. At 808, the data is processed against the GAP database. At 810, the non-integrated tool can now interface to IS-enabled tools. The process then reaches a Stop block. If, however, the registration information can be stored natively, flow is from 804 to 812 to process without the GAP. Flow is then to the Stop block.

Figure 9:
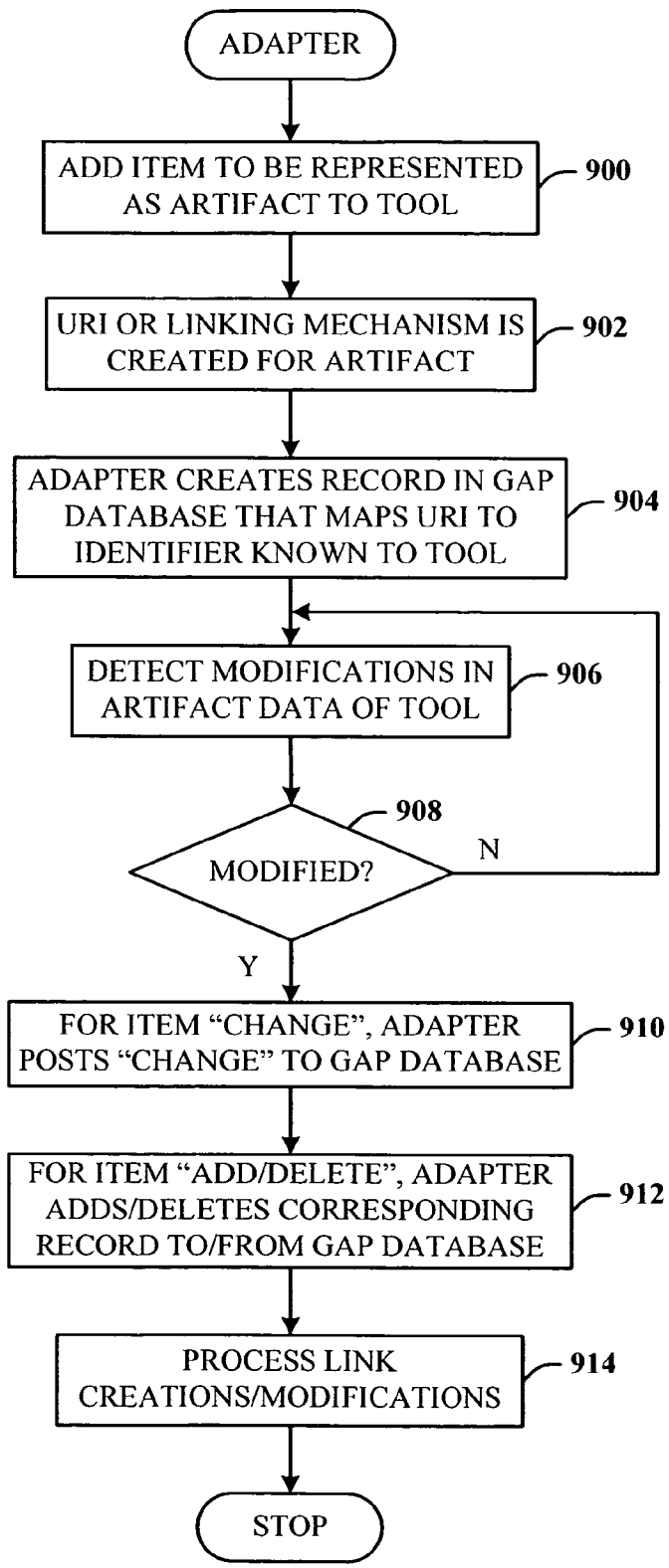
FIG. 9 illustrates a flow chart of one method of implementing a GAP adapter in accordance with the present invention.

Referring now to FIG. 9, there is illustrated a flow chart of one method of implementing a GAP adapter in accordance with the present invention. When artifacts are modified, there is one record in the GAP database for each artifact. In order to construct an adapter, it must be possible to detect changes in the artifact data stored in the underlying tool.

At 900, an item is added to be represented as an artifact to a tool. At 902, a URI is created for the artifact. When an item to be represented as an artifact is added to the tool, the tool adapter creates a corresponding artifact record in the GAP by using the GAP UpdateArtifactData method, as indicated at 904. This record maps this artifact URI to the identifier that is known to the tool (called its External Id). For instance, the external Id for a document stored in a file share can be its folder hierarchy and file name.

The artifact record conforms to the GAS, in that it includes, for example, the artifact's URI, title, external Id and extended attributes. At 906, the system operates to detect modifications in artifact data of the tool. At 908, the system determines if a modification has occurred. If No, flow is back to 906 to continues monitoring for modifications. If Yes, flow is to 910 where, for an item "change", the tool adapter posts the modification by using the GAP UpdateArtifactData method. Note that it is important to distinguish between a change and a delete/add to maintain the integrity of links to and from GAP artifacts. At 912, if the modification is an "add/delete", the adapter adds/deletes the corresponding record to/from the GAP database. When an item related to an artifact is deleted, the tool adapter deletes the corresponding record from the GAP by using the GAP UpdateArtifactData method. When a link from an artifact is to be created or modified, the UpdateArtifactData method is used. At 914, link creations and modifications are process. The process then reaches a Stop block. To handle external addressability, an artifact handler is defined and registered.

GAP API

Because it is both an artifact provider and an artifact consumer, the GAP API offers each of the standard server provider and consumer methods and behaviors (that is, all methods in the IToolServerLinking Interface. In addition, it offers the following methods to enable maintenance of the artifact data it holds.

bool UpdateArtifactData(Artifact[ ] artifacts)

A caller populates an Artifact array object and invokes UpdateArtifactData to update the GAP database. The Artifact array includes the entire artifact description as held in the GAP database, including extended attributes and links. Each artifact must have a valid value for its ChangeType attribute (add, change, delete).

On add: If the <tool-specific id> for an artifact's Uri is set to the special value "<?>", GAP generates a unique ID and replaces the associated Uri in its Artifact.Uri property. Otherwise, the value of <tool-specific id> is used directly. An error is raised on an attempt to add an artifact when a record keyed by the incoming Artifact.Uri value is already present in the GAP.

On change or delete, a record keyed by the incoming Artifact.Uri value must exist in the database, otherwise an error is raised.

Artifact[ ] GetArtifactsByExternalId(string[ ] externalId)

This method is used to return GAS-compliant Artifacts based on the external Ids to which a GAP artifact's URI is matched. Note that the Artifact array includes both URI and external Id, so the standard GetArtifacts method is used to determine the external Id given a URI; this method enables a URI to be determined given an external Id.

Figure 10:
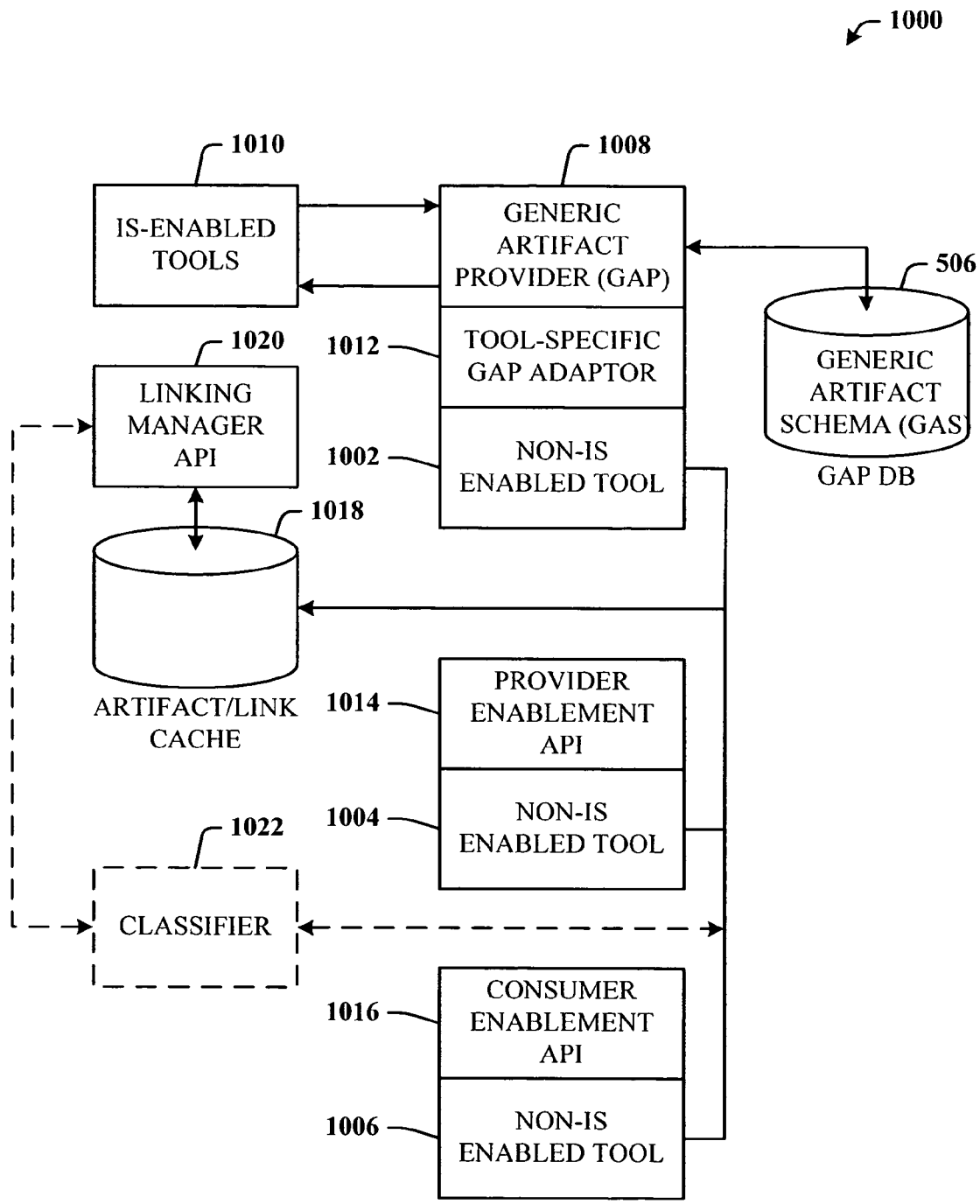
FIG. 10 illustrates a system that facilitates accessing non-integrated tools in accordance with the present invention.

Referring now to FIG. 10, there is illustrated a system 1000 that facilitates accessing non-integrated tools in accordance with the present invention. The system 1000 illustrates the use of several non-integrated tools, a first tool 1002, a second tool 1004, and a third tool 1006. The first tool 1002 requires implementation of the GAP 1008 to be enabled as an artifact provider to an IS-enabled tool 1010. In support thereof, a tool-specific adapter 1012 is created that facilitates exposing one or more artifacts to the enabled tool 1010. Links and references can be stored in the GAP database 506 according to GADS.

The second tool 1004 integrates a provider enablement API 1014 on top of a native interface that exposes it artifacts publicly. The third tool 1006 integrates a consumer enablement API 1016 on top of a native interface that exposes references to the provider artifacts of the second tool 1004 and artifacts of the first tool 1002.

The system 1000 further includes an artifact/link cache 1018 that caches artifact and link information in accordance with the present invention. A linking manager 1020 manages the cache 1018. The cache 1018 interfaces at least with the first, second and third tools (1002, 1004, and 1006) to facilitate caching at least the artifact and link information, and other information described herein.

The subject invention (e.g., in connection with selection) can employ various artificial intelligence based schemes in the form of, e.g., a classifier 1022 (optional), for carrying out various automatic processes of the subject invention. The implementations described herein have generally dealt only with one hop, that is, a tool interfacing directly with another tool. The classifier 1022 can be used to facilitate a more sophisticated query a link description can be derived that extends beyond one hop.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically perform a number of functions, including but not limited to determining according to a predetermined criteria what artifacts to expose, what priority can be applied for exposing artifacts, what tools should be exposed before other tools, what artifacts can be exposed based on the type of data, the user, and location of the data, for example.

The Artifact/Link Cache

The Artifact/Link cache is a centralized store into which artifacts and the links they hold are replicated to enable high performance query access. By gathering together brief artifact and link data into a single database, cross-service reference inversions can be processed much more efficiently.

Figure 11:
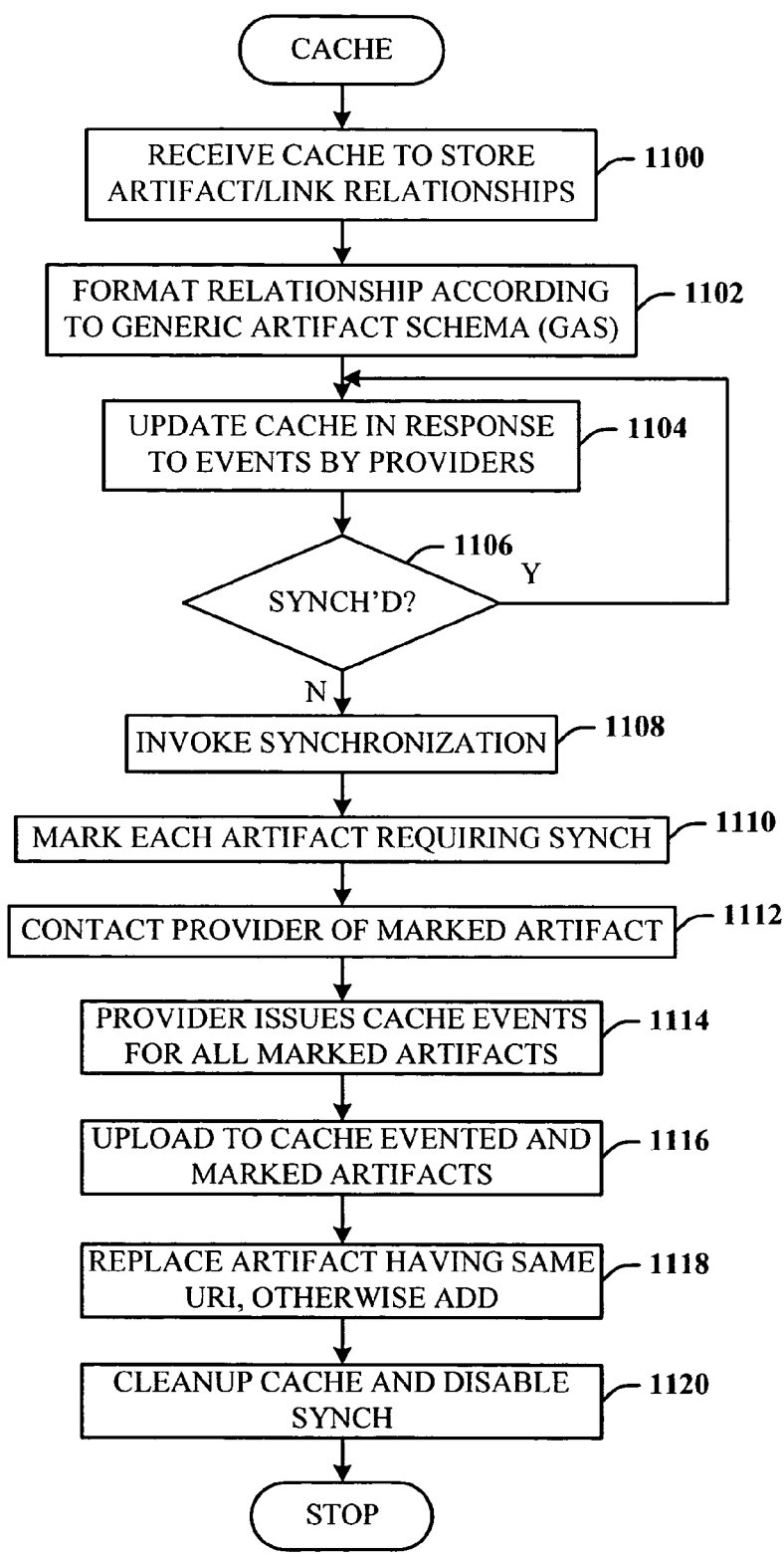
FIG. 11 illustrates a flow chart of a process for one implementation of a cache in accordance with the present invention.

Referring now to FIG. 11, there is illustrated a flow chart of a process for one implementation of a cache in accordance with the present invention. At 1100, a cache is employed to store artifact/link relationships. At 1102, the relationship is formatted according to the GAS. At 1104, updates to the cache are made in response to ArtifactChanged events raised by artifact providers. An IS cache manager subscribes to ArtifactChanged and uses the event object, an object that conforms to the GAS, to update itself. Since the cache is updated asynchronous to actual artifact updates it can briefly be out-of-sync with the underlying store. However, the latency is short and is, for most applications, acceptable. When zero latency is required, a tool can bypass the cache and make requests directly to a tool through its standard GetArtifacts/GetReferencingArtifacts methods. The cache is stored in a database that conforms to the Generic Artifact Database schema. The cache differs from the GAP database in that the GAP database is the master copy of mapping information and links, while the cache database is the master for nothing, and is completely recreatable.

Referring again to FIG. 11, at 1106, a determination is made as to whether the cache has been synchronized with the underlying data. In the event that, as a result of network or system failures, the cache and the underlying data fall permanently out-of-sync, IS provides an administrative SynchronizeArtifactCache utility that collaborates with each artifact provider to restore the cache. This utility invokes each artifact provider's SynchronizeArtifactCache method. If no synchronization is required, flow is from 1106 to 1104 to update the cache. If synchronization is required, flow is from 1106 to 1108 to invoke synchronization. Cache synchronization behaves as follows. An IS SynchronizeArtifactCache utility is invoked (programmatically or through an administrative function). If a cache synchronization is already in progress, a warning is provided; however, the warning can be overridden. In a IS Administrative Database, the state "global synchronization in progress" is set.

At 1110, each cached artifact to be synchronized (based on date range) is marked with a "to be cached" flag. At 1112, each provider is contacted that has artifacts that have been marked. The artifact provider's SynchronizeArtifactCache method is invoked and sets the state "<tool-instance> synchronization in progress" in the Administrative Database. At 1114, the artifact provider's SynchronizeArtifactCache method issues a CacheArtifact event for each candidate artifact (or for a set of candidate artifacts). At 1116, evented and marked artifacts are uploaded to the cache. When the artifact provider has issued CacheArtifact events for all candidate artifacts, it fires an EndCacheLoad event with its own tool instance as a parameter. The IS Cache Manager listens for ArtifactChanged and CacheArtifact events. Both events are handled in the same way: each artifact included in the Artifacts parameter on the event is placed in the cache.

At 1118, if an artifact in the cache exists with the same URI, it is replaced. Otherwise it is added. Note that the replaced or added entries do not have their "to be cached" flags set. The IS Cache Manager listens for the EndCacheLoad event. When received, at 1120, cache clean-up is performed such that all artifacts in the cache for the tool instance specified by EndCacheLoad that are marked "to be cached" are deleted. This removes any cached items whose corresponding artifacts have been deleted from their primary store. IS turns off the "<tool-instance> synchronization in progress" state. When the final provider's "<tool-instance> synchronization in progress" state is turned off, the "global synchronization in progress" state is turned off. The process then reaches a Stop block.

API Reference

This section includes all method signatures defined elsewhere in the document with a reference to the method's elaboration. Additionally, overloads for methods offered by IS are accompanied by a Message Qualifier. By convention in ASP.Net, an overloaded method's MessageName property is formed by concatenating the method name and the message qualifier, as illustrated below. These message names are invisible to consumers of the services.

The following code represents that the message name defaults to the method name, in this case, GetArtifacts.

```
[WebMethod]
public ArtifactID GetArtifacts(string[ ] ArtifactUri)
{ /* Get Artifacts; use cache if possible */ }
```

In the following, the message name is explicitly specified. By convention, it is formed by concatenating method names plus the message qualifier form the signature table. In this case, the message qualifier Direct, so the message name is GetArtifactsDirect.

```
[WebMethod(MessageName="GetArtifactsDirect")]
public ArtifactID GetArtifacts(string[ ] ArtifactUri)
{ /* Get Artifacts directly from artifact provider */ }
```

Schemas and Data Types

Generic Artifact Schema (GAS) and Artifacts Class: GAS is an XML schema that defines a generic format for a displayable artifact. The schema appears below and is followed by an explanation of each of its elements. When a GAS conform ant document is deserialized into an object, the object takes the form shown in "The Artifacts Class". Note that in the APIs, the Artifacts object never appears; instead, an array of Artifact objects is used.

```xml
<?xml version="1.0" encoding="utf-8" ?>
<xs:schema
targetNamespace="http://www.company.com/Tool/
GenericArtifactSchema.xsd"
   elementFormDefault="qualified" xmlns="http://www.company.com/
Tool
/GenericArtifactSchema.xsd"
   xmlns:mstns="http://www.company.com/ Tool /
   GenericArtifactSchema.xsd"
xmlns:xs="http://www.w3.org/2001/XMLSchema">
   <!-- By declaring ISUri a simple type we can add validation later. -->
   <xs:simpleType name="ISUri">
      <xs:restriction base="xs:string" />
   </xs:simpleType>
   <!-- Enumeration for usage in ArtifactChanged event. -->
   <xs:simpleType name="ChangeType">
      <xs:restriction base="xs:string">
         <xs:enumeration value="Add" />
         <xs:enumeration value="Change" />
         <xs:enumeration value="Delete" />
         <xs:enumeration value="NoChange" />
      </xs:restriction>
   </xs:simpleType>
   <xs:element name="Artifacts">
      <xs:complexType>
         <xs:sequence>
            <xs:element name="Artifact" type="Artifact" minOccurs="1"
maxOccurs="unbounded" />
         </xs:sequence>
      </xs:complexType>
   </xs:element>
   <xs:complexType name="Artifact">
      <xs:sequence>
         <xs:element name="Uri" type="ISUri" />
         <xs:sequence minOccurs="0" maxOccurs="1">
            <xs:element name="ArtifactTitle" type="xs:string" />
            <xs:element name="ArtifactTypeName" type="xs:string" />
            <xs:element name="LastChangedOn" type="xs:dateTime" />
            <xs:element name="LastChangedBy" type="xs:string" />
            <xs:element name="ExternalId" type="xs:string"
minOccurs="0" maxOccurs="1" />
            <xs:element name="ExtendedAttributes" minOccurs="0"
maxOccurs="1">
               <xs:complexType>
                  <xs:sequence>
                     <xs:element name="ExtendedAttribute"
type="ExtendedAttribute" minOccurs="0"
   maxOccurs="unbounded" />
                  </xs:sequence>
               </xs:complexType>
            </xs:element>
            <xs:element name="OutboundLinks" minOccurs="0"
maxOccurs="1">
               <xs:complexType>
                  <xs:sequence>
                     <xs:element name="OutboundLink"
type="OutboundLink" minOccurs="0"
                        maxOccurs="unbounded" />
                  </xs:sequence>
               </xs:complexType>
            </xs:element>
         </xs:sequence>
      </xs:sequence>
      <xs:attribute name="ChangeType" type="ChangeType"
default="NoChange" use="optional" />
   </xs:complexType>
   <xs:complexType name="ExtendedAttribute">
      <xs:sequence>
         <xs:element name="Name" type="xs:string" />
         <xs:element name="Value" type="xs:string" />
         <xs:element name="FormatString" type="xs:string"
minOccurs="0" />
      </xs:sequence>
   </xs:complexType>
   <xs:complexType name="OutboundLink">
      <xs:sequence>
         <xs:element name="LinkType" type="xs:string" />
         <xs:element name="ReferencedUri" type="ISUri" />
      </xs:sequence>
   </xs:complexType>
</xs:schema>
```

Element Artifacts

Contains 1:m Artifact elements, each of which describes a generic IS artifact. One Artifact element per incoming ArtifactId will be appear in the Artifacts element.

Element Artifact

Contains exactly one displayable Artifact which consists of the following sub-elements:

Uri: the Uri of the returned artifact.

ArtifactTitle: the localized, friendly name of the returned artifact.

ArtifactTypeName: the localized, friendly name of the returned artifact's type.

LastChangedOn: date and time of last change, if available.

LastChangedBy: userId of last person to change this artifact, if available.

External Id: This element is reserved for use by the IS generic artifact provider. It contains information that enables IS and its agents to access an item that has no direct artifact provider.

ExtendedAttributes: a collection of name/value pairs that describe optional artifact-specific properties the provider may offer.

OutboundLinks: a collection of link type/referenced Uri pairs that describe an outbound link from this artifact.

ChangeType is an optional attribute on the Artifact element that is only meaningful in the context of the ArtifactChanged event.

The Artifacts Class

```
//----------------------------------------------------------------
// <autogenerated>
//      This code was generated by a tool.
//      Runtime Version: 1.1
//
//      Changes to this file may cause incorrect behavior and will be
//      lost if the code is regenerated.
// </autogenerated>
//----------------------------------------------------------------
//
// This source code was auto-generated by xsd, Version=1.1
//
using System.Xml.Serialization;
[System.Xml.Serialization.XmlTypeAttribute(Namespace="http:
//www.company.com/Tool/GenericArtifactSchema.xsd")]
[System.Xml.Serialization.XmlRootAttribute(Namespace="http://www.
company.com/Tool/GenericArtifactSchema.xsd", IsNullable=false)]
public class Artifacts {
    [System.Xml.Serialization.XmlElementAttribute("Artifact")]
    public Artifact[ ] Artifact;
}
[System.Xml.Serialization.XmlTypeAttribute(Namespace="http://www.
company.com/Tool/GenericArtifactSchema.xsd")]
public class Artifact {
```

```
                                            -continued public string Uri;
public string ArtifactTitle;
public string ArtifactTypeName;
public System.DateTime LastChangedOn;
public string LastChangedBy;
public string ExternalID;
[System.Xml.Serialization.XmlArrayItemAttribute(IsNullable=false)]
public ExtendedAttribute[ ] ExtendedAttributes;
[System.Xml.Serialization.XmlArrayItemAttribute(IsNullable=false)]
public OutboundLink[ ] OutboundLinks;
[System.Xml.Serialization.XmlAttributeAttribute( )]
public ChangeType ChangeType = ChangeType.NoChange;
}
[System.Xml.Serialization.XmlTypeAttribute(Namespace="http://www.
company.com/Tool/GenericArtifactSchema.xsd")]
public class ExtendedAttribute{
    public string Name;
    public string Value;
    public string FormatString;
}
[System.Xml.Serialization.XmlTypeAttribute(Namespace="http://www.
company.com/Tool/GenericArtifactSchema.xsd")]
public class OutboundLink{
    public string LinkType;
    public string ReferencedUri;
}
[System.Xml.Serialization.XmlTypeAttribute(Namespace="http://www.
company.com/Tool/GenericArtifactSchema.xsd")]
public enum ChangeType {
    Add,
    Change,
    Delete,
    NoChange,
}
```

Generic Link Schema (GLS) and Links Class

GLS is an XML schema that defines a generic format for artifact links. It is returned by the ExtractLinks method. The schema appears below and is followed by an explanation of each of its elements. When a GLS conformant document is deserialized into an object, the object takes the form shown under "The Links Class" sections.

```
<?xml version="1.0" encoding="utf-8" ?>
<xs:schema id="ISGenericLinkSchema"
targetNamespace="http://tempuri.org/ISGenericLinkSchema.xsd"
    elementFormDefault="qualified"
xmlns="http://tempuri.org/ISGenericLinkSchema.xsd"
    xmlns:mstns="http://tempuri.org/ISGenericLinkSchema.xsd"
        xmlns:xs="http://www.w3.org/2001/XMLSchema">
        <xs:element name="Links">
            <xs:complexType>
                <xs:sequence>
                    <xs:element name="Link" type="Link"
minOccurs="1" maxOccurs="unbounded" />
                </xs:sequence>
            </xs:complexType>
        </xs:element>
        <xs:complexType name="Link">
            <xs:sequence>
                <xs:element name="ReferringUri" type="xs:string" />
                <xs:element name="LinkType" type="xs:string" />
                <xs:element name="ReferencedUri" type="xs:string" />
            </xs:sequence>
        </xs:complexType>
</xs:schema>
```

Element Links

Contains 1:m Link elements, each of which describes a link between two IS artifacts.

Element Link

Describes one link between two artifacts:

ReferringUri: the Uri of the referring (consumer) artifact.

LinkType: the type of the link.

ReferencedUri: the URI of the referenced (provider) artifact.

The Links Class

```
//------------------------------------------------------------------
// <autogenerated>
//     This code was generated by a tool.
//     Runtime Version: 1.1
//
//     Changes to this file may cause incorrect behavior and will be
//     lost if the code is regenerated.
// </autogenerated>
//------------------------------------------------------------------
//
// This source code was auto-generated by xsd, Version=1.1
//
using System.Xml.Serialization;
[System.Xml.Serialization.XmlTypeAttribute(Namespace=
"http://tempuri.org/ISGenericLinkSchema.xsd")]
[System.Xml.Serialization.XmlRootAttribute(Namespace=
"http://tempuri.org/ISGenericLinkSchema.xsd", IsNullable=false)]
public class Links {
    [System.Xml.Serialization.XmlElementAttribute("Link")]
    public Link[ ] Link;
}
[System.Xml.Serialization.XmlTypeAttribute(Namespace=
"http://tempuri.org/ISGenericLinkSchema. xsd")]
public class Link {
    public string ReferringUri;
    public string LinkType;
    public string ReferencedUri;
}
```

LinkFilter Class

The LinkFilter class is used in query methods to filter results. Each artifact consumer must respect the filter in its GetReferencingArtifacts implementation.

```
    public class LinkFilter
    {
        public enum filterType
        {
            ToolInstance,
            ArtifactType,
            LinkType
        }
        public filterType Type;
        public string[ ] Values;
    }
```

ArtifactId Class

The ArtifactId class is used to collect data that is used to form an artifact's Uri using the EncodeUri and DecodeUri methods.

```
    public class ArtifactId
    {
        public string VisualStudioServerNamespace;
        public string Tool;
        public string ArtifactType;
        public string ToolSpecificId;
    }
```

Generic Artifact Database Schema

The following is a depiction of the generic artifact database schema used both for the Generic Artifact Provider and for the Artifact/Link Cache. Essentially, it is the database implementation of a GAS schema with the following exceptions: the rovider name and artifact type are not present. They are automatically derived from the URI when an artifact instance is read and are ignored when an artifact instance is written. Optional bit attribute "Sync Flag" is used only in the cache and holds the instance-specific synchronization state.

Sample Computing System

Figure 12:
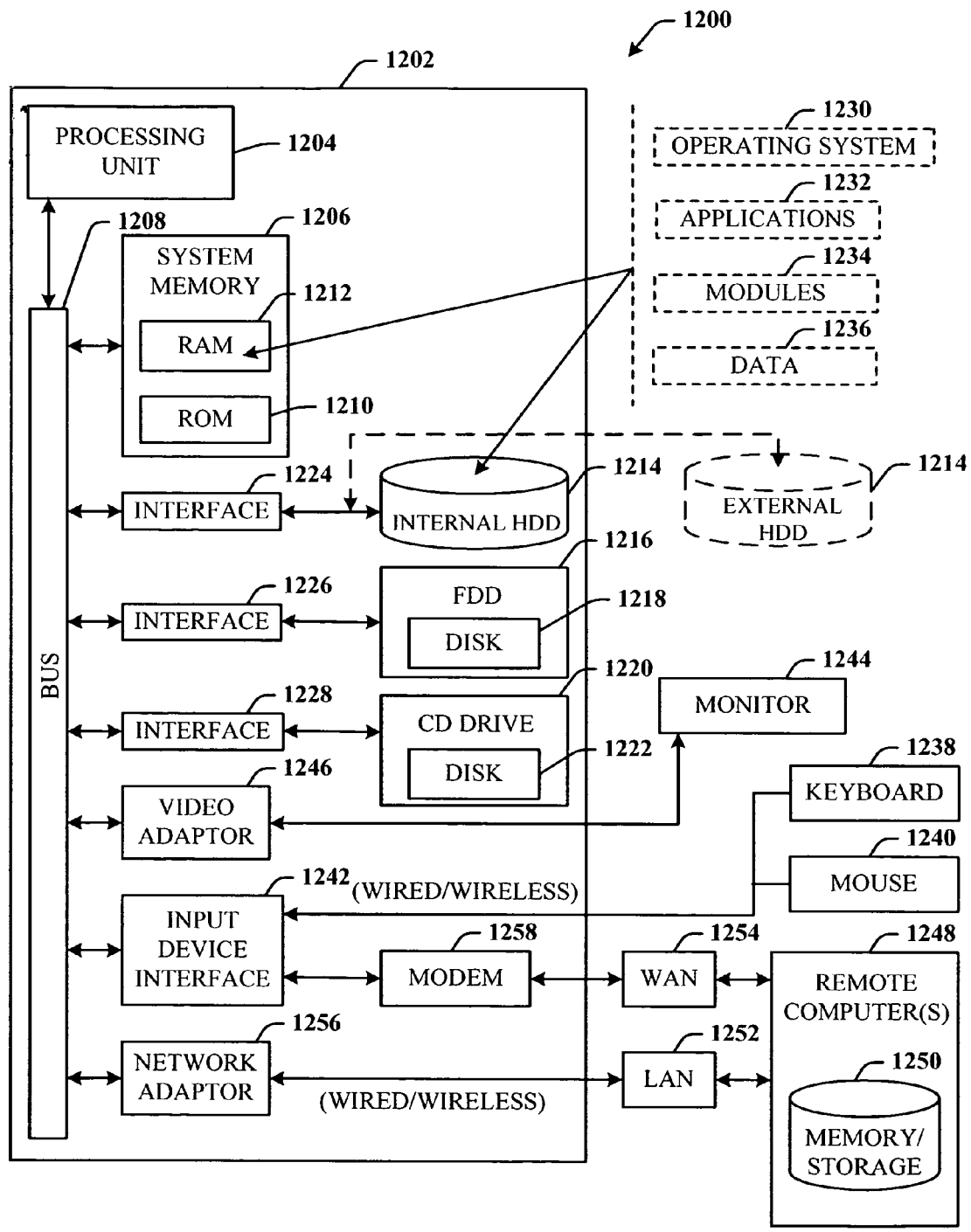
FIG. 12 illustrates a block diagram of a computer operable to execute the disclosed architecture.

Referring now to FIG. 12, there is illustrated a block diagram of a computer operable to execute the disclosed architecture. In order to provide additional context for various aspects of the present invention, FIG. 12 and the following discussion are intended to provide a brief, general description of a suitable computing environment 1200 in which the various aspects of the present invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer readable media can comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 12, there is illustrated an exemplary environment 1200 for implementing various aspects of the invention that includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures may also be employed as the processing unit 1204.

The system bus 1208 can be any of several types of bus structure that may further interconnect to a memory bus (with or without a memory controller), a peripheral bus, and a local bus using any of a variety of commercially available bus architectures. The system memory 1206 includes read only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1202, such as during start-up. The RAM 1212 can also include a high-speed RAM such as static RAM for caching data.

The computer 1202 further includes an internal hard disk drive (HDD) 1214 (e.g., EIDE, SATA), which internal hard disk drive 1214 may also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 1202, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the present invention.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212.

It is appreciated that the present invention can be implemented with various commercially available operating systems or combinations of operating systems.

A user can enter commands and information into the computer 1202 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 1394 serial port, a game port, a USB port, an IR interface, etc.

A monitor 1244 or other type of display device is also connected to the system bus 1208 via an interface, such as a video adapter 1246. In addition to the monitor 1244, a computer typically includes other peripheral output devices (not shown), such as speakers, printers etc.

The computer 1202 may operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices, and companies, and facilitate enterprise-wide computer networks, such as intranets, all of which may connect to a global communication network, e.g., the Internet.

When used in a LAN networking environment, the computer 1202 is connected to the local network 1252 through a wired and/or wireless communication network interface or adapter 1256. The adaptor 1256 may facilitate wired or wireless communication to the LAN 1252, which may also include a wireless access point disposed thereon for communicating with the wireless adaptor 1256. When used in a WAN networking environment, the computer 1202 can include a modem 1258, or is connected to a communications server on the LAN, or has other means for establishing communications over the WAN 1254, such as by way of the Internet. The modem 1258, which can be internal or external and a wired or wireless device, is connected to the system bus 1208 via the serial port interface 1242. In a networked environment, program modules depicted relative to the computer 1202, or portions thereof, can be stored in the remote memory/storage device 1250. It will be appreciated that the network connections shown are exemplary and other means of establishing a communications link between the computers can be used.

The computer 1202 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with conventional network or simply an ad hoc communication between at least two devices.

Wi-Fi, or Wireless Fidelity, allows connection to the Internet from a couch at home, a bed in a hotel room or a conference room at work, without wires. Wi-Fi is a wireless technology like a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, with an 11 Mbps (802.11b) or 54 Mbps (802.11a) data rate or with products that contain both bands (dual band), so the networks can provide real-world performance similar to the basic 10BaseT wired Ethernet networks used in many offices.

Figure 13:
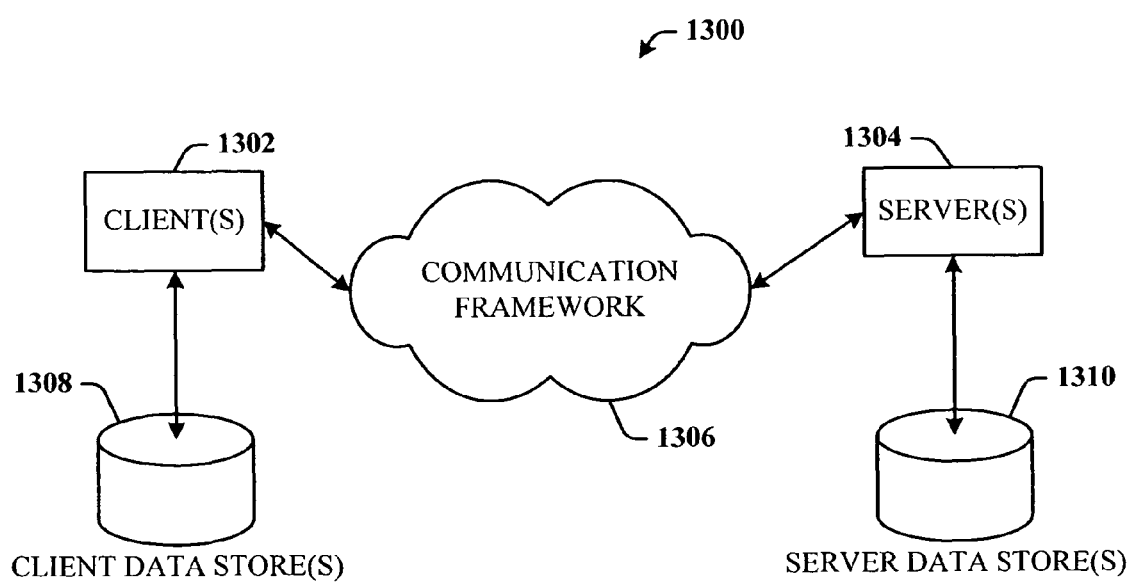
FIG. 13 illustrates a schematic block diagram of an exemplary computing environment in accordance with the present invention.

Referring now to FIG. 13, there is illustrated a schematic block diagram of an exemplary computing environment 1300 in accordance with the present invention. The system 1300 includes one or more client(s) 1302. The client(s) 1302 can be hardware and/or software (e.g., threads, processes, computing devices). The client(s) 1302 can house cookie(s) and/or associated contextual information by employing the present invention, for example. The system 1300 also includes one or more server(s) 1304. The server(s) 1304 can also be hardware and/or software (e.g., threads, processes, computing devices). The servers 1304 can house threads to perform transformations by employing the present invention, for example. One possible communication between a client 1302 and a server 1304 can be in the form of a data packet adapted to be transmitted between two or more computer processes. The data packet may include a cookie and/or associated contextual information, for example. The system 1300 includes a communication framework 1306 (e.g., a global communication network such as the Internet) that can be employed to facilitate communications between the client(s) 1302 and the server(s) 1304.

Communications can be facilitated via a wired (including optical fiber) and/or wireless technology. The client(s) 1302 are operatively connected to one or more client data store(s) 1308 that can be employed to store information local to the client(s) 1302 (e.g., cookie(s) and/or associated contextual information). Similarly, the server(s) 1304 are operatively connected to one or more server data store(s) 1310 that can be employed to store information local to the servers 1304.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates the interface of non-integrated applications, comprising:
   a processor coupled to memory that stores:
   a first application program interface (API) of a first, source-control application, the first API configured as an artifact provider, the first API comprising:
      a first web service which returns artifact identifiers comprising universal resource identifiers (URIs) that individually correspond to artifacts of the source-control application;
         wherein each artifact of the artifacts of the source-control application includes an item of data publicly exposed to other applications: and
         wherein each artifact of the artifacts of the source-control application is associated with a build of a software program written in software code stored in the source-control application; and a first method that receives a URI as a parameter and returns an instance of an artifact that has an artifact identifier that matches the URI that was received as the parameter;

a second application program interface (API) of a second, defect-tracking application, the second API configured as an artifact consumer that hosts artifacts of the defect-tracking application, the artifacts of the defect-tracking application including references the defect-tracking application publicly exposes to other applications, each reference being associated with one referring artifact hosted by the defect-tracking application and is a link to one referenced artifact of the source-control application hosted by the artifact provider, the link further comprises a link type that describes a relationship between the referring artifact of the defect-tracking application and the referenced artifact of the source-control application, the defect-tracking application being configured to access the items of data of the artifacts of the source-control application via the first API, the source-control application being configured to access the references of the artifacts of the defect-tracking application via the second API;

wherein the defect-tracking application is configured to access the items of data of the artifacts of the source-control application via the first API by:
using the web service of the first API to obtain the URIs that individually correspond to artifacts of the source-control application; and
repeatedly calling the first method of the first API with the obtained URIs used as parameters.

2. The system of claim 1, further comprising a linking component that links the reference with the corresponding artifact of the source-control application.

3. The system of claim 2, wherein the linking component is an artifact identifier held by the artifact consumer that points to an artifact.

4. The system of claim 2, wherein the links is a binary link.

5. The system of claim 1, wherein at least one of the provider and the consumer is a tool or service.

6. The system of claim 1, wherein the artifact provider registers an artifact type for each artifact it provides, and registers a corresponding link type that each artifact can host.

7. The system of claim 1, further comprising a generic artifact provider (GAP) that interfaces to a tool to facilitate storing and exposing both artifacts and artifact links.

8. The system of claim 7, further comprising a GAP adapter that provides an interface between the GAP and a non-integrated application.

9. The system of claim 1, further comprising a cache that stores the artifacts and associated artifact links.

10. The system of claim 1, further comprising a user interface that facilitates presenting inter-artifact references.

11. The system of claim 1, wherein the link is an artifact identifier that is an immutable and uniquely constructed key.

12. The system of claim 1, further comprising a link manager that manages a cache by updating and purging cache contents.

13. The system of claim 1, wherein the artifact provider and artifact consumer are at least one of loosely coupled and tightly coupled.

14. The system of claim 1, further comprising a classifier that makes an inference based on parameters related to at least one of the artifact consumer, artifact provider, and non-integrated applications.

15. The system of claim 1, wherein the artifact provider creates and reveals a URI for at least one of loosely-coupled server-based interactions, loosely-coupled clients, caching, and tightly-coupled interactions that support artifact-specific functions by contract with a caller.

16. A computer-readable storage medium having computer-executable instructions for performing a method for facilitating an interface between non-integrated applications, the method comprising:
providing a first application program interface (API) of source-control application, the first API configured as an artifact provider, the first API comprising:
a first web service which returns artifact identifiers comprising universal resource identifiers (URIs) that individually correspond to artifacts of the source-control application; and
a first method that receives a URI as a parameter and returns an instance of an artifact that has an artifact identifier that matches the URI that was received as the parameter;
exposing a referenced artifact hosted by the source-control application via the artifact provider, the referenced artifact comprising an item of public data of the source-control application;
providing a second application program interface (API) of a defect-tracking application, the second API configured as an artifact consumer that hosts artifacts of the defect-tracking application, the defect-tracking application including a referring artifact comprising an item of public data of the defect tracking application;
exposing a reference held by defect-tracking application and the referring artifact associated with the reference via the artifact consumer; and
linking the referring artifact to the referenced artifact via the reference, the reference including an artifact identifier of the referenced artifact, the defect-tracking application being configured to access the item of public data of the referenced artifact via the first API, the source-control application being configured to access the item of public data of the referring artifact via the second API;
wherein the defect-tracking application is configured to access the item of public data of the referenced artifact via the first API by:
using the web service of the first API to obtain a URI that corresponds to the referenced artifact; and
repeatedly calling the first method of the first API with the obtained URI used as a parameter.

17. The computer-readable storage medium of claim 16, further comprising computer-executable instructions for:
registering an artifact type for the referring artifact and the referenced artifact; and
registering a link type that the referring artifact and the reference artifact hosts.

18. The computer-readable storage medium of claim 16, further comprising computer-executable instructions for presenting dependency information of the referenced artifact to a user, the information including at least one of link type, artifact type, artifact name, and modification date.

19. The computer-readable storage medium of claim 16, wherein at least one of the artifact consumer or artifact provider is a web service.

20. The computer-readable storage medium of claim 16, further comprising computer-executable instructions for generating an artifact proxy that represents data stored in a non-integrated application.

21. The computer-readable storage medium of claim 16, wherein the referenced artifact and referring artifact are representative of at least one of a source file, defect, requirement, test result or build.

22. The computer-readable storage medium of claim 16, wherein computer-executable instructions for linking the referring artifact to the referenced artifact via the reference comprise computer-executable instructions for creating a link between the referring artifact and the referenced artifact that includes a referring DRI, a referenced URI, and a link type.

23. The computer-readable storage medium of claim 16, further comprising computer-executable instructions for discovering which referring artifacts hold links to a specific referenced artifact.

24. The computer-readable storage medium of claim 16, further comprising computer-executable instructions for raising an event when the referenced artifact is at least one of created, deleted, and changed.

25. The computer-readable storage medium of claim 16, further comprising computer-executable instructions for providing external addressability for the referenced artifact by the artifact provider.

26. A computer-implemented system that facilitates data integration among one or more non-integrated applications in a development environment, comprising:
    at least one processor, coupled to a memory, that executes the following computer-executable components:
    an integration service in the development environment that includes one or more nonintegrated applications that each comprise at least one artifact, the integration service comprises:
    a source-control application and a defect-tracking application that each include one or more artifacts, the one or more artifacts are items of data of the applications that are publicly exposed, the one or more artifacts include artifact types and unique artifact identifiers;
    a first application program interface (API) configured as an artifact provider associated with the source-control application, the artifact provider that facilitates exposing at least a referenced artifact of the source-control application, the first API comprising:
        a first web service which returns artifact identifiers comprising universal resource identifiers (URIs) that individually correspond to artifacts of the source-control application; and
        a first method that receives a URI as a parameter and returns an instance of an artifact that has an artifact identifier that matches the URI that was received as the parameter;
    a second application program interface (API) configured as an artifact consumer associated with the defect-tracking application, the artifact consumer that facilitates exposing at least a referring artifact of the defect-tracking application and a reference associated with the referring artifact, the reference includes an artifact identifier corresponding to the referring artifact exposed by the artifact provider, the defect-tracking application being configured to access the referenced artifact of the source-control application via the first API, the source-control application being configured to access the referring artifact of the defect-tracking application via the second API; and
    a linking component that facilitates creation of a link between the referring artifact and the referenced artifact via the reference included in the artifact consumer, the link includes a link type that indicates a type of relationship between the referring artifact and the referenced artifact;
    wherein the defect-tracking application is configured to access the referenced artifact of the source-control application via the first API by:
        using the web service of the first API to obtain a URI that corresponds to the referenced artifact; and
        repeatedly calling the first method of the first API with the obtained URI used as a parameter.

* * * * *